US005832420A

United States Patent [19]

Yuhara et al.

[11] Patent Number: 5,832,420

[45] Date of Patent: Nov. 3, 1998

[54] DATA COLLECTION APPARATUS

[75] Inventors: Hiroshi Yuhara; Masahiko Takahashi; Yukinori Kasajima; Noriyuki Sakuma; Hideki Sano; Kazutoshi Okamoto; Kiyofumi Miyahara; Shuji Katsuoka; Mayumi Tamura; Naoyuki Harada, all of Tokyo, Japan

[73] Assignee: Yokogawa Electric Corporation, Tokyo, Japan

[21] Appl. No.: 715,277

[22] Filed: Sep. 16, 1996

[30] Foreign Application Priority Data

| | | | |
|---|---|---|---|
| Sep. 27, 1995 | [JP] | Japan | 7-249563 |
| Oct. 27, 1995 | [JP] | Japan | 7-280418 |
| Apr. 25, 1996 | [JP] | Japan | 8-105576 |

[51] Int. Cl.[6] ........ G01K 7/00

[52] U.S. Cl. ........ 702/127; 702/130

[58] Field of Search ........ 364/131, 132, 364/133, 134, 138, 557, 550, 551.01, 551.02, 554; 400/328; 74/89.15; 395/108; 101/93.04, 93.05; 702/127, 130–136, 150, 179–185, 187, 188

[56] References Cited

U.S. PATENT DOCUMENTS

| | | | |
|---|---|---|---|
| 4,053,040 | 10/1977 | McGourty | 400/328 |
| 5,555,171 | 9/1996 | Sonehara et al. | 364/551.01 |

*Primary Examiner*—James P. Trammell
*Attorney, Agent, or Firm*—Moonray Kojima

[57] ABSTRACT

A data processor for processing, recording and/or displaying data obtained from an object being examined, comprising a plurality of detachable units formed of functional blocks connected together by communication cables; a carriage driver using a screw to improve character print quality and resolution; a plurality of input units which convert signals obtained from the object into digital output signals; a control unit comprising a plurality of connectors attached to the respective input units and an arithmetic/communication device having information about positions at which the connectors are mounted and collecting signals obtained from the object and arithmetically processing the signals, and storage device wherein results of the arithmetic processing are stored; wherein the control unit processes data obtained from the object using signals tored in the storage device, and produces the recording and/or display; and wherein the character printing portion of the control unit comprises a support and driver for driving the carriage, with the support holding the carriage on which the recording head is carried so that the carriage can move across the paper, and wherein the driver comprises a motor and a screw connected to the motor shaft, and a nut mounted on the carriage and meshed with the screw. Advantageously, the functions can be flexibly increased or decreased as desired, and the number of components can be flexibly decreased so that the entire system has a greatly increased efficiency, economy, and reliability.

26 Claims, 20 Drawing Sheets

DATA COLLECTION APPARATUS

BACKGROUND OF THE INVENTION

1. Field of Invention

This invention relates to an apparatus for processing, recording, and/or displaying data about an object being investigated; and more particulary, to such apparatus comprising a plurality of detachable units formed of functional blocks which can be extended or contracted as desired.

2. Description of the Prior Art

FIG. 1 shows a known hybrid recorder, wherein part A is an analog section including an input terminal part 1, a multiplexer 2 acting as a scanner, and an A/D converter 3; part B is an arithmetic-and-control (also called herein "arithmetic/control" ) section including two microprocessors (MPUs) 4*a*, 4*b*, memories 5*a*, 5*b*, a key display interface 6, a warning interface 7, and a communication interface 8; and part C is a recording section including a key display 10, a warning output terminal part 11, and various drivers 12 for recording.

A signal obtained by measurement, for example, of an object, is applied to input terminal 1 of the recorder. With respect to this signal, points are sequentially selected one by one by scanner 2. The signal is then converted into digital form by analog section A according to a preset measurment range. The obtained data is sent to the arithmetic/control section B, where the data undergoes various kinds of processing, such as linearizing, scaling, and calculations for warning according to the kind of input received. The data is converted into two kinds of data, i.e., data used for display and data used for recoring. The two kinds of data are stored in memories 5*a* and 5*b*, respectively. The converted data for recording includes data represented in analog form and data expressed by means of printed characters, and correspond to recording positions. The different controls are provided by first microprocessor 4*a*.

The recording is done by a raster scanning method, for example. Whenever a printhead moves a given increment from one end of a paper toward the other end, microprocesosr 4*b* refers to the data used for the recording. If corresponding data exists, the solenoid of the printhead is excited to print dots. This operation is repeated. When the printhead reaches the other end, one scan is ended.

FIG. 2 shows the functions of the hybrid recorder, wherein each function is represented by a block. The recorder includes input terminal part 1, multiplexer 2, A/D converter 3, microprocessors 4, a character printing processing part 12, a warning interface 7, a warning output terminal part 11, a general purpose communication function 13, and a communication interface 8, each of which is represented by a block. The blocks are housed in a single housing.

FIG. 3(*a*) shows front view of a recording in a normally mounted state, and FIG. 3(*b*) shows a side view thereof. The body of recorder 98 is supported by a support base 99 inserted in a hole formed in panel 100.

In the foregoing data processor, the input unit comprises input terminal part 1, multiplexer 2, and A/D converter 3. The output unit comprises warning output terminal part 11, warning output unit 7, etc. The configuration of the prior apparatus is permanently fixed, and it is difficult to extend or contract the functions when such is desired. For example, where terminals for inputs and waranings are required to be increased or reduced, it is necessary to redesign the housing which encloses the components. The various units are controlled by microprocessors 4. Control signals for the multiplexer and the input signals for entry of data are different in electrical specifications from those of the output signals for data output. Hence, it is impossible, for example, to remove analog inputs and to add warning outputs in their places.

Since the varios units are under control of microprocessors 4, all of the units must be located within the same housing. For example, it is impossible to place only one analog input block apart from the housing. As a result, limitations are imposed on any modifications that may be made to the apparatus.

FIG. 4 shows the character printing mechanism of the character printing processing part 12 and schematically shows a configuration for driving the carriage across the paper. In FIG. 4, the ribbon cassette is not shown for sake of clarity of description. The mechanism comprises carriage 30, to which a recording head assembly 9 is attached, a front portion support shaft 31 for supporting the front portion of carriage 30, and a rear portion support shaft 32 for supporting an eccentric portion disposed on the rear portion of carriage 30. Support shafts 31,32 are held at a given distance from each other by side plates 33*a*, 33*b*. One part of a driving belt 34 is wound around the rotating shaft of a head scanner 36, another part being anchored to carriage 30. Belt 34 is stretched by rollers 35*a*, 35*b*. Also shown are a driver circuit 37 for driving head scanner 36; recording paper 38, and an encoder 39.

FIG. 5 shows the structure of rear portion support shaft 32 having the eccentric portion. Eccentric shaft 32 comprises a wide shaft 32*a* and a narrow shaft 32*b* mounted on the opposite end of wide shaft 32*a* and located off the center thereof. A lever plate 40 is provided with an arcuate hole 40*a* near its outer periphery and has a cylindrical hub portion 40*b* in which narrow shaft 32*b* is inserted. The narrow shaft 32*b* is fixedly mounted with embedded screws 41*a*, 41*b*.

When hub portion 40*b* and opposite narrow shaft 32*b* are inserted in the holes, respectively, formed in side plates 33*a*, 33*b* and rotated in the direction indicated by arrow M, rear portion support shaft 32 is rotated eccentrically. Carriage 30 is rotated about front portion support shaft 31 as indicated by arrow N in FIG. 4.

FIG. 6 illustrates displacement of the spacing between an impacting pin 30*f* and the outer surface of a platen 43 when rear portion support shaft 32 is rotated. When narrow shaft 32*b* of rear portion support shaft 32 is rotated relative to the front portion support shaft 31, as shown, the angular position $\theta$ of the center line connecting rear portion support shaft 32 with front portion support shaft 31 is varied. At the same time, the outer surface of wide shaft 32*a* is moved a maximum distance of L. Thus, it is necessary to hold rear portion support shaft 32 so as to be movable toward and away from carriage 30. When the spacing between the front end of impacting pin 30*f* and the outer surface of platen 43 assumes an optimum value, rear portion support shaft 32 forces a screw 42 into arcuate hole 40*a* in lever plate 40 (see FIG. 5), whereby shaft 32 is mounted in side plates 33*a*, 33*b*.

FIG. 7 shows a structure for supporting rear portion support shaft 32 when carriage 30, shown in FIG. 4, is viewed from the direction indicated by arrow Z. Two bosses 30*b*, 30*c*, having holes, are formed in a rear portion of carriage 30 and spaced a given distance from each other. The holes are of desired dimensions. The shafts of bearings 30*d*, 30*e* are mounted with press fitting in the holes of the bosses. Wide shaft 32*a* of rear portion support shaft 32 is made to bear against the outer peripheries of the bearings.

Wide portion 32*a* of rear portion support shaft 32 is capable of absorbing movement of carriage 30 indicated by L in FIG. 6. Wide portion 32*a* is so supported that it can slide across paper 38.

FIG. 8 shows a structure for mounting recording head assembly wherein two layers are formed, a top head 9*a* used for printing characters, and a bottom head 9*b* used to make recordings according to the signals obtained by measurement. The impacting pin (not shown) is located under the head assembly. Top head 9*a* and bottom head 9*c* are fixedly mounted to a holding plate 9*c* provided with a mounting hole 9*d*. Hole 9*d* is brought above a threaded hole 30*g* in carriage 30, and fixed together with screws (not shown).

Electric power is supplied to a solenoid (not shown) for driving the impacting pin from a head driver circuit (not shown) through a flexible circuit 9*e*. Since top head 9*a* and bottom head 9*b* are separately driven, a relay plate 9*h* consisting of a printed wiring board (also called printed wire board, printed circuit board, etc) is equipped with two connectors 9*i*, 9*j*. The connectors 9*i*, 9*j* are connected to top head 9*a* and bottom head 9*b*, respectively, via a flexible circuit 9*k*.

In the mechanism of FIG. 4, carriage 30, having the recording head assembly attached thereto, is driven via belt 34 wound around the shaft of a stepping motor for head scanner 36. As ambient temperature changes, belt 34 is stretched or shrunk. Also, the material of belt 34 ages with passage of time. Thus, errors are produced. In addition, whenever the mechanism is assembled or serviced, it is necessary to adjust the tension in the belt.

In the rear portion support shaft, or the eccentric shaft, narrow portion 32*b* is integral with wide portion 32*a*. One side of the narrow portion is inserted into lever plate 40 and fixed with embedded screws 41*a*, 41*b*. Thus, it is difficult to machine eccentric shaft 32. Also, the mechanism has the disadvantage that it comprises a large number of components. Also, the shaft of the bearing is mounted by press fitting in boss holes 30*b*, 30*c* formed in carriage 30. Wide portion 32*a* of rear portion support shaft 32 is made to abut against the outer periphery of the bearing. Thus, the accuracies of the various dimensions, such as the outside diameters of the boss holes, the outside diameter of the bearing, and the outside diameter of the shaft against which the wide portion abuts, must be adhered to. Accordingly, it is difficult to machine such parts.

When recording head assembly 9 is mounted on carriage 30, flexible circuit 9*k* for driving top head 9*a* and bottom head 9*b* separately is required to be inserted into two connectors 9*i*, 9*j* to integrate the components. Hence, a large number of components is required. Moreover, it is difficult to insert relay plate 9*h* because it is located behind carriage 30.

FIG. 9 shows the input terminal part of a prior art data processor, wherein terminals 51 (six sets of terminals are shown) are secured to a terminal base 52 made of an insulating member. Terminals 51 are connected to printed wire board 54 via lead terminals 53. Interconnects located inside the apparatus are connected to lead terminals directly or via a connector (not shown) mounted on printed wire board 54. A temperature sensor 55 measures the temperature of board 54. For example, a thermocouple may be used to sense the temperature and compensation for reference contact may thus be obtained. Conductive interconnects 56 are formed on printed wire board 54.

If the input unit incorporates the input terminals, temperature sensor, DC/DC conversion means, A/D conversions means, etc, at least the DC/DC conversion means and A/D conversion means will generate heat. Where a signal is obtained from the thermocouple 55, if the temperature of the measuring terminal portion is higher than room temperature, a temperature difference is produced, and the reference contact is not accurately compensated for. Hence, countermeasures should be instituted against the heat generated by the different components.

SUMMARY OF THE INVENTION

Accordingly, an object of the invention is to overcome the aforementioned and other disadvantages and deficiencies of the prior art.

Another object is to provide a data processor comprising a plurality of detachable units or blocks to which different functions are assigned. The units are connected by transmission cables such that the functions can be extended or contracted as desired. The processor uses a screw as a carriage driver whereby character print quality and resolution are improved. Furthermore, the processor comprises a fewer number of components than conventional processors. Also, the number of manufacturing steps required to assemble the processor is less than heretofore required.

The object is attained by a data processor comprising: input units for receiving signals obtained from one or more objects to be examined by measurement of various quantities and converting the signals into digital form, the input units having communication means for sending the resulting digital signals; at least one data collecting apparatus having a plurality of connectors which have the same industrial standards and to which the input units can be attached, the data collecting apparatus further including an arithmetic and communication (also labelled herein as arithmetic/communication) means having information about positions at which the connectors are mounted, the arithmetic/communication means acting to collect the measurement signals and to perform arithmetic processing, the data collecting apparatus further including a storage means for storing the results of the arithmetic processing; and a control unit for processing signals, using the signals stored in the storage means of the data collecting apparatus, and for making recordings of the measurements.

The control unit has a character printing portion comprising a support means and a driver means for driving the carriage on which a recording head assembly is carried. The support means holds the carriage in such a manner that the carriage can move across a paper. The driver means comprises a driving motor, a screw connected to the driving shaft of the motor, and a nut mounted on the carriage. The nut meshes with the screw. Each of the input units comprises a measuring terminal section, a printed wire board on which electrical signal conversion means are formed, and a connecting member. The measuring terminal section has another printed wire board on which are disposed the input terminals, a temperature sensor for compensation of a refernce contact, an input selector means,etc. The connecting member has a heat dissipating board and an air circulation passage. The heat dissipating board connects the two printed wire boards.

BRIEF DESCRIPTION OF THE DRAWINGS

FIG. 3(*b*) is a side elevational view depicting the recorder of FIG. 3(*a*).

FIG. 20(*b*) is a cross sectional view depicting the carriage of FIG. 19 wherein a driving mechanism is mounted on the carriage.

FIG. 20(*c*) is a perspective view depicting the screw of FIG. 20(*b*).

FIG. 20(*d*) is a cross sectional view depicting the screw of FIG. 20(*c*).

DETAILED DESCRIPTION OF THE PREFERRED EMBODIMENTS

Figure 10:
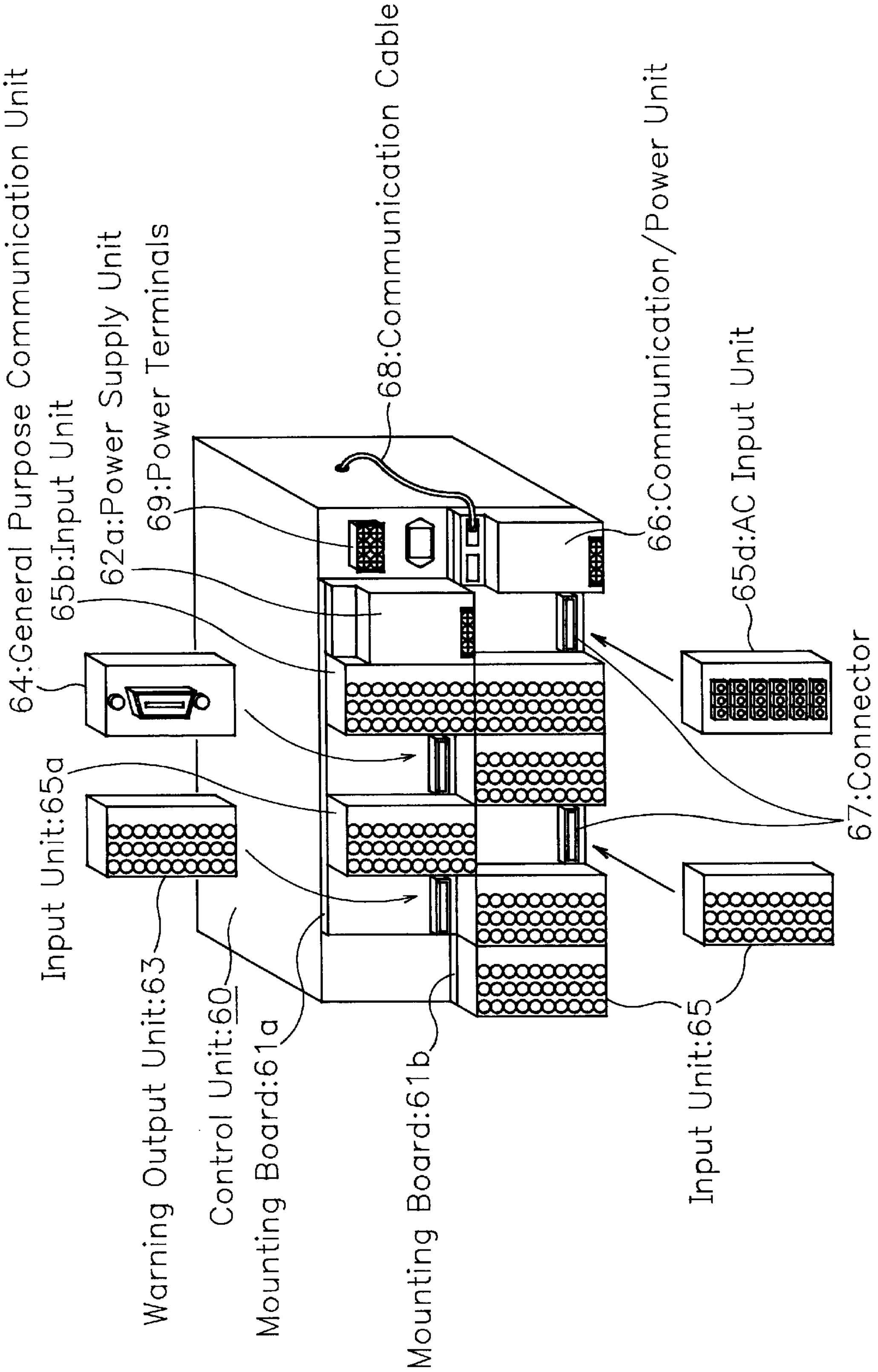
FIG. 10 is a perspective view depicting an illustrative embodiment of the invention.

FIG. 10 shows a data processor of the invention comprising a control unit 60 forming the body thereof. The processor has means (not shown) for printing characters and for displaying images on its front side. The processor further includes a mounting board 61*a* to which a power supply unit 62*a*, a warning output unit 63, and a general purpose communication unit 64 are attached. Also, two input units 65*a*, 65*b* are mounted on the mounting board.

The processor includes another mounting board 61*b* to which five input units 65, an AC input unit 65*d* for measuring electric power, for example, and a communication/power unit 66, are mounted. Communication/power unit 66 combines a communication unit and a power supply unit in one unit.

The foregoing units are housed in their respective housings of similar size and are attached to the mounting boards 61*a*, 61*b* via connectors 67 of the same industrial standards. The communication unit of communication/power supply unit 66 exchanges signals with control unit 60 via a communication cable 68. The control unit has power terminals 69.

Figure 11:
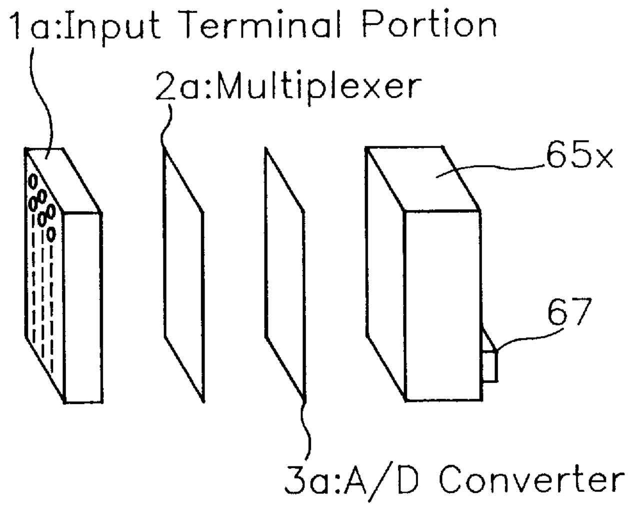
FIG. 11 is an exploded perspective view depicting an input unit of FIG. 10 and illustrating blocks representing different functions.

FIG. 11 shows blocks of different functions of each input unit. Each input unit has an input terminal portion la, a multiplexer 2*a*, and an A/D converter 3*a*. A/D converter 3*a* comprises a control section for controlling multiplexer 2*a*, an A/D converter, and means for transmitting converted digital signals. The components are housed in a casing 65*x*. Connectors 67, for electrical and mechanical connections with mounting boards 61*a*, 61*b*, are attached to casing 65*x*.

Figure 12:
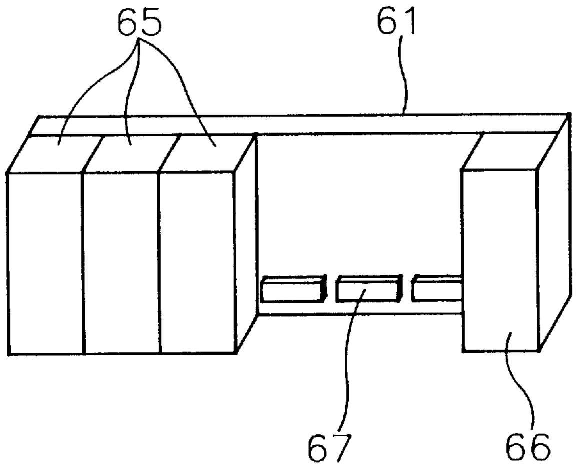
FIG. 12 is a perspective view depicting a mounting board of FIG. 10 wherein input units and a communication/power unit are attached thereto.

FIG. 12 shows a mounting board 61 (e.g. mounting board 61*a* or 61*b*) to which three input units 65 and communication/power unit 66 are mounted. The units are secured to mounting board 61 via connectors 67. Connectors 67 are similar in properties, that is have generally the same industrial standards or specifications.

Figure 13:
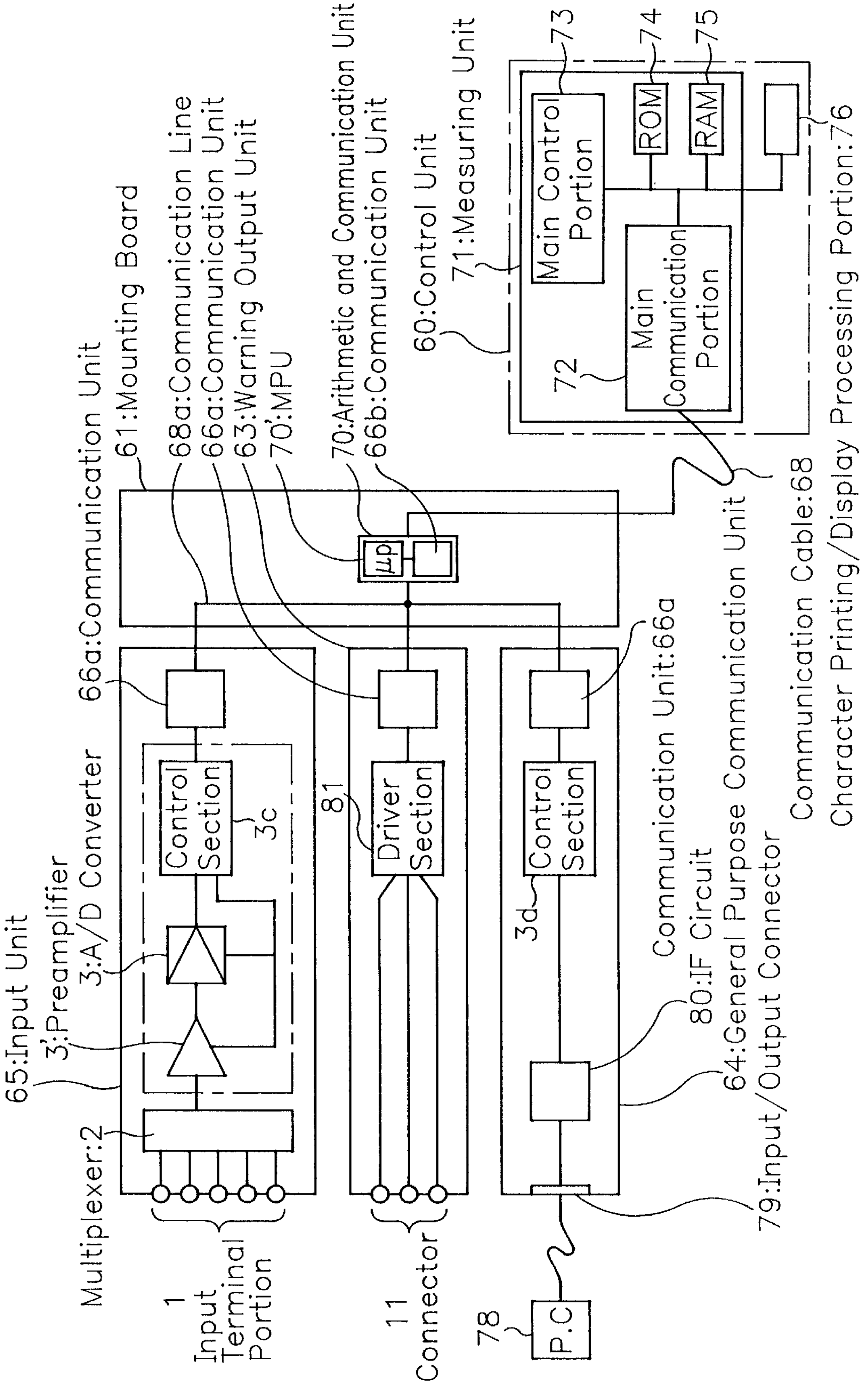
FIG. 13 is a block diagram depicting electrical connections of the embodiment of FIG. 10.

FIG. 13 shows one example of electrical connections of the embodiment of FIG. 10. In this embodiment of FIG. 13, one input unit 65, warning output unit 63, and general purpose communication unit 64 are mounted on mounting board 61. Mounting board 61 has an atithmetic/commuhication unit 70 comprising a microprocessor (MPU) 70' which performs various kinds of processing, such as calculation of format of input signals obtained by measurement, and calculation of linearization, and then sends the signals to a main communication portion 72 (described hereinafter) via a communication unit 66*b*.

Control unit 60 comprises a measuring unit 71 and a character printing/display processing portion 76. The main communication portion 72, forming measuring unit 71, sends instruction from main control portion 73 to communication unit 66*b* on mounting board 61. Main control portion 73 performs various kinds of control operations, such as setting of sampling intervals for the various input units, setting of measurement range, control operations for printing characters and displaying images, according to control programs loaded in a ROM 74. Data obtained by measurement of an object are collected in a RAM 75.

One end of communication cable 68 is connected to main communication portion 72, while the other end is connected to arithmetic/ communication unit 70. Arithmetic/ communication unit 70 comprises microprocessor 70' and communication unit **66*b*, and is connected to warning output unit 63 and to communication unit 66*a* of general purpose communication unit 64 , by a communication line 68*a*. A unique address is given to each unit, depending on the number given to mounting board 61 and on the position at which the unit is mounted. Each unit constantly monitors signals sent from communication cable 68 via communication line 68*a***. When a communication with the address assigned to the unit itself is started, the unit responds.

The operation of the embodiment is as follows. First, mounting board 61 sequentially communicates with all of the address on communication line **68*a* and discriminates between responding addresses and non-responding addresses. Mounting board 61 instructs the responding addresses to inform board 61 of the kinds of units being instructed. Mounting board 61 determines the configuration of mounting boards 61** from the responses.

Main control portion 73 sequentially communicates with all of the mounting boards 61 (only one is shown, but more can be used) on communication cable 68. Main control portion 73 instructs all of the boards to report the configurations on the mounting boards. Main control portion73 determines the configuration of the entire system from the responses.

A plurality of signals from one or more objects being examined are coupled to input terminal portion 1 of input unit 65 and are selected at given timing by multiplexer 2. Then, the selected signals are converted into digital form by preamplifier 3' and an A/D converter 3. A control section **3*c* controls multiplexer 2 and A/D convert 3. Digital output signals from A/D converter 3 are sent to communication line 68*a* via communication unit 66*a***.

Mounting board 61 calls for the input unit to which signals, obtained by measurement, are to be applied via communication line **68*a*. Mounting board 61 instructs the input unit to send the signals obtained by the measurements. The accepted signals are subjected to arithmetic processing by microprocessor 70*a*. The resulting signals are sent to communication cable 68 via communication unit 66*b***.

Main control portion 73 calls for mounting board 61 via main communication portion 72 according to control programs stored in ROM 74, and instructs the board to send signals obtained by the measurements. The received or accepted signals are stored in RAM 75. The stored signals are subjected to arithmetic processing by main control portion 73 according to the control program stored in ROM 74. The resulting signals are sent to character printing/ display processing portion 76, where the printer is operated and/or characters are displayed on the display unit. The object under examination is not always suitable for character printing or display, but, it suffices in most cases to subject only a selected part thereof to character printing and display.

If the results of calculations are that a numerical value obtained from the object exceeds a certain value, for example, then main control portion 73 supplies a warning instruction via main communication portion 72, mounting board 61, and communication unit **66*a*, in that order. A driver section 81 actuates contacts according to instructions and issues a warning via a connector 11**.

When the results of calculations performed by main control portion 73 are that the result arising from the object should be sent to an external personal computer 78, then, the results are produced from input/output connector 79 via main communication portion 72, mounting board 61, communication unit **66*a*, control section 3*d*, and interface circuit 80**, in that order.

Because the units mounted on each mounting board 61 can be detached with use of connectors 67 (see FIGS. 10 and 12), the system can be extended or contracted as desired by increasing or reducing the number of mounting boards 61 and number of mounted units.

Figure 14:
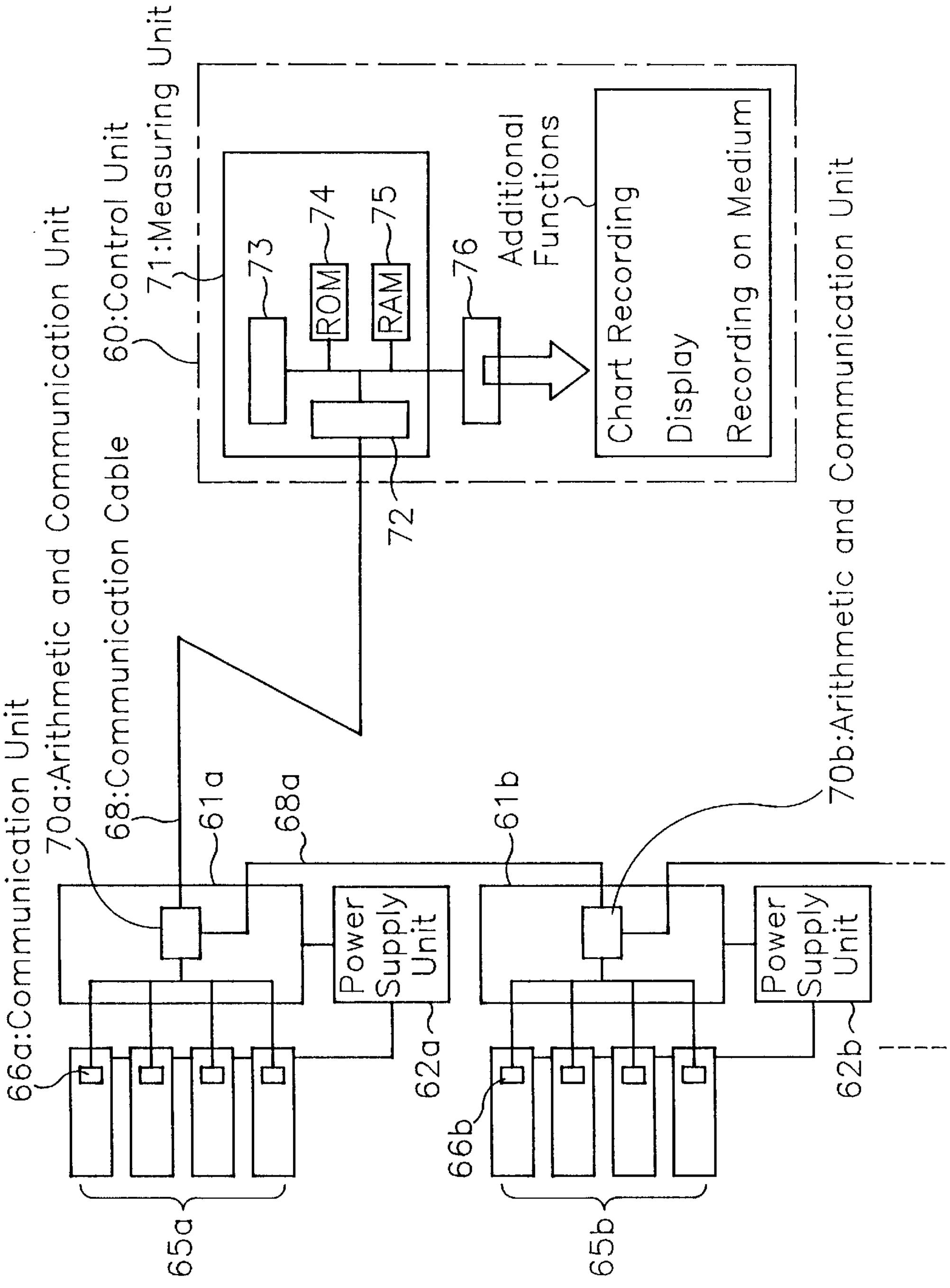
FIG. 14 is a diagram depicting connections of various units mounted on the mounting boards of FIG. 10.

FIG. 14 shows a plurality of input units connected, by communication cable 68. Four input units **65*a* are mounted on one mounting board 61*a*. Mounting board 61*a* has an arithmetic/communication unit 70*a*, which is connected to an arithmetic/communication unit 70*b* mounted to the next stage of the mounting board 61*b* via communication line 68*a***. The system can be extended or contracted as desired by connecting numerous mounting board with communication cables.

In the above example, the number of input units is extended by use of communication units. Control unit 60 may comprise two separate units, i.e. measuring unit 71 and display unit **76*a*, as shown in FIGS. 15**(*a*) and 15(*b*).

Figure 15:
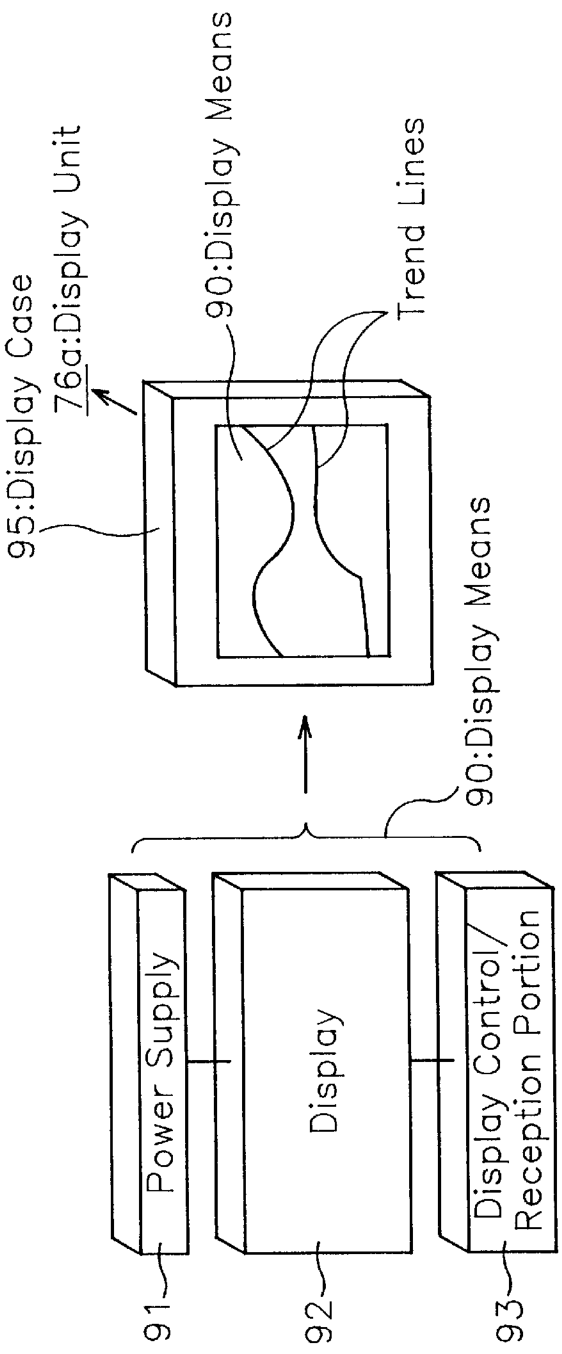
FIGS. 15(*a*) and 15(*b*) are perspective views depicting display units used with the embodiment of FIG. 10.
Figure 15:
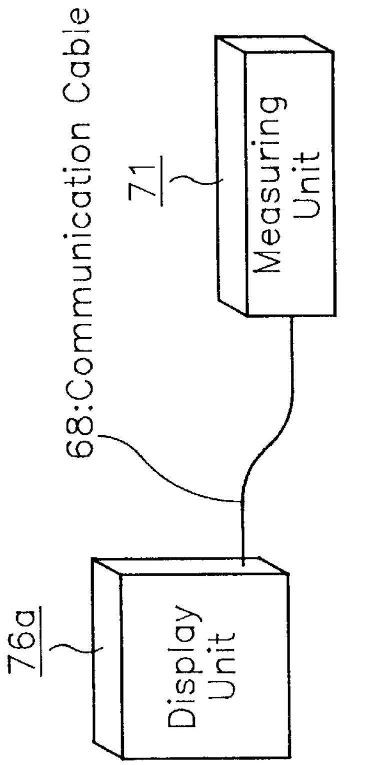

In FIG. 15(*a*), display means 90 comprises power supply 91, display unit 92, and reception/display control portion 93, which components are housed in a display case 95 to thereby constitute a display unit **76*a*. In FIG. 15**(*b*), measuring unit 71 incorporates instruments necessary for measurements, such as main communication portion 72, main control section 73, ROM 74, RAM 75, and input units 65 shown in FIG. 13. A communication cable 68 connects the reception portion of display unit **76*a* with main communication portion 72 of measuring unit 71**.

In the foregoing embodiment, it is only required that display unit **76*a* comprise reception/display control portion 93, power supply 91 and display 92 which are incorporated in display case 95. As a result, display case 95** can be made smaller in size, thinner in thickness, and lighter in weight. Thus, when units are coupled to each other by digitial communication having speed sufficient to update the data, then remote data can be transmitted at substantially lower cost.

Heretofore, it was necessary to form holes in a panel to mount the body of a recorder on a support base. Since in the invention display unit **76*a*** can be made smaller, thinner and of less weight, the unit can be mounted on a wall. Thus, a greater degree of flexibility is possible for installing the unit.

Power supply 91 and display control portion 93 in display unit **76*a* may be located on the side of measuring unit 71 so that only display unit 92 is incorporated in display unit 76*a***. In that case, signals transmitted between the units may be high speed image signals. Advantageously, therefor, prior limitations on distance and cost are overcome by the invention.

In the embodiment, mounting board 61 is coupled to control unit 60 by communication cable 68. Alternatively, communication cable 68 is separated, and only mounting board 61 is placed close to the object being investigated. The instrument is used as a data collection apparatus.

As described thus far, in the invention, here are provided a plurality of mounting boards equipped with a plurality of connectors of the same industrial standard or specification, thus permitting attachment of a plurality of input units. Each mounting board has an arithmetic/communication unit and storage means. The arithmetic/communication unit has information about positions at which the input units are mounted, and collects signals obtained by measurement. The arithmetic/communication unit performs calculations on the signals. The results of the calculations are stored in the storage means. Thus, it is easy to attach and detach the input units, and the numbers thereof can be expanded or contracted as desired. The mounting board may be mounted directly on the body of the recorder or placed at a remote location. In the latter case, the boards are connected by a communication cable. Thus, a small sized or large sized distributed measurement can be carried out with similar ease. Since the input units can be readily detached, it is relatively easy to wire the system. That is to say, the input unit can be first detached, and then, input signal lines can then be connected to the input/output terminals. Then, the units can be mounted to the mounting board. Advantageously, with the embodiment, greater flexibility is attained because the display unit can be located either with the system or at a remote location and connected to the body with a communication cable.

Figure 16:
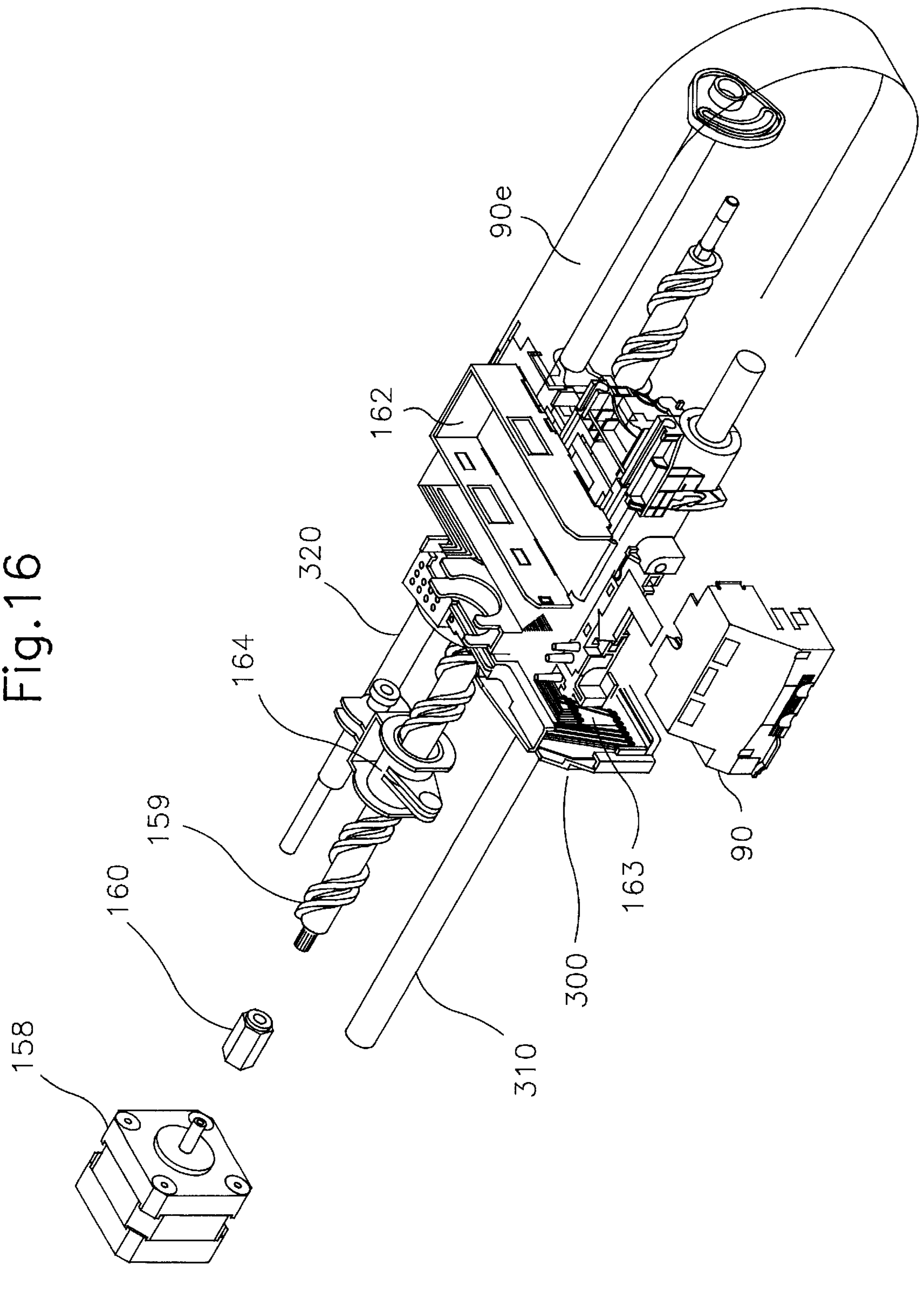
FIG. 16 is an exploded perspective view depicting blocks of a carriage, a screw, a nut, and a driver means of the embodiment of FIG. 10.

The character printing portion of control unit 60 is next described with reference to FIG. 16, which shows carriage 300 and its driving mechanism. A front portion support shaft 310 is located in the front of carriage 300 and extends through carriage 300. A rear portion support shaft 320 is located in the rear of carriage 300.

Mounted in front of carriage 30 are recording head assembly 90, printed wire board 163 for transmitting signals obtained by measurement of the object from flexible sheet 90*e* to recording head assembly 90, and nut 164 meshing with screw 159. The nut 164 meshes with screw 159 while received in a recess formed under carriage 300. Also shown are a ribbon case 162, in which a ribbon cassette (not shown) is inserted, and a stepping motor 158. Rotation of motor 158 is transmitted to screw 159 via a joint 160.

Figure 17:
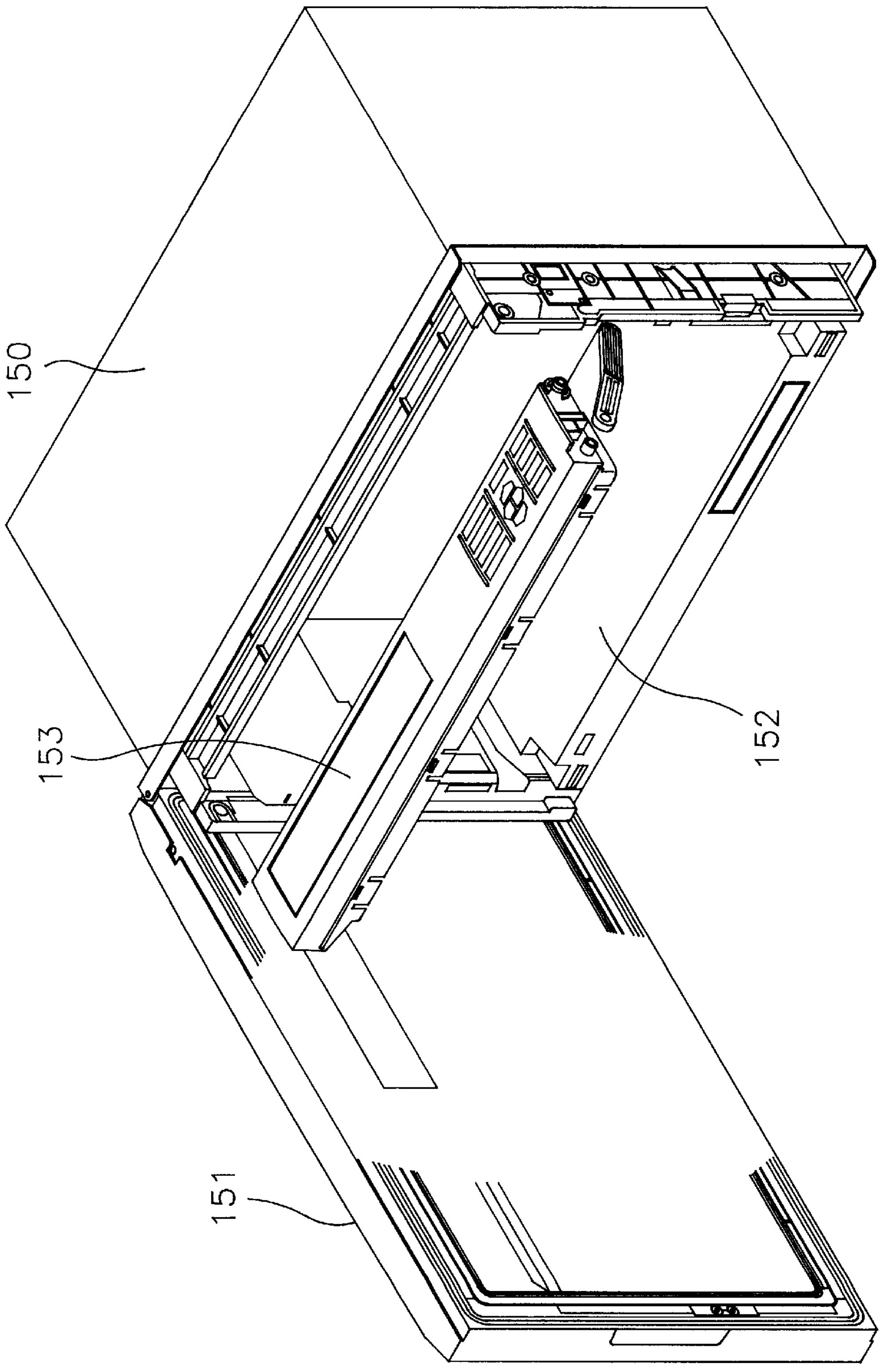
FIG. 17 is a perspective view depicting housing for the embodiment of FIG. 10.

FIG. 17 shows the external configuration of the embodiment, comprising an outer housing 150, a door 151, an inside casing 152 housed in outer housing 150, and a display/control portion 153 mounted in the inside casing 152.

Figure 18:
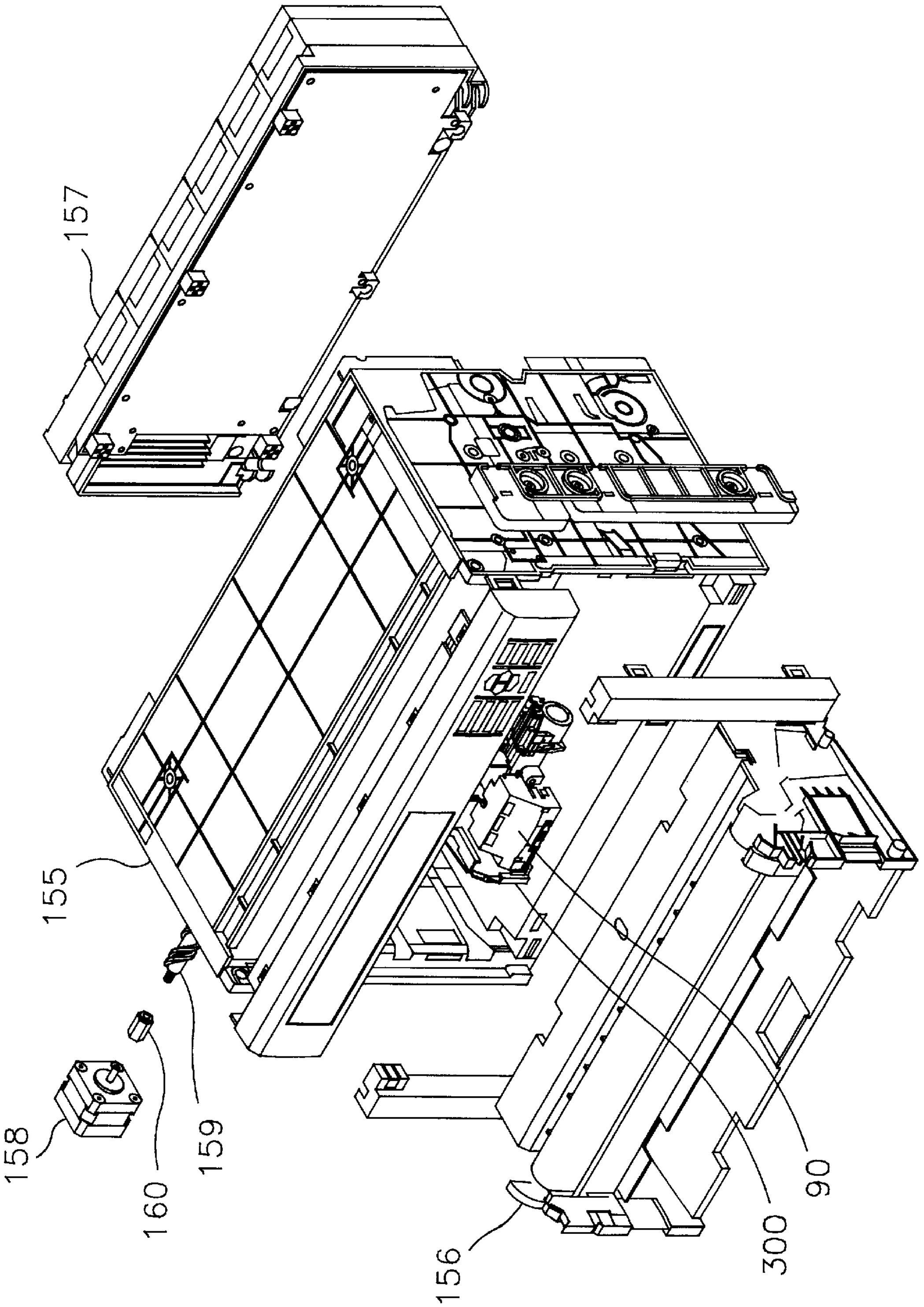
FIG. 18 is an exploded perspective view depicting an inside housing for the embodiment of FIG. 10.

FIG. 18 shows inside casing 155 (note in FIG. 17, inside casing is also labeled 152). A chart cassette 156 is received in the body of inside casing 155, which has a rear cover 157. Stepping motor 158 and screw 159 are connected together by joint 160. Also shown are carriage 300 and recording head assembly 90.

Figure 19:
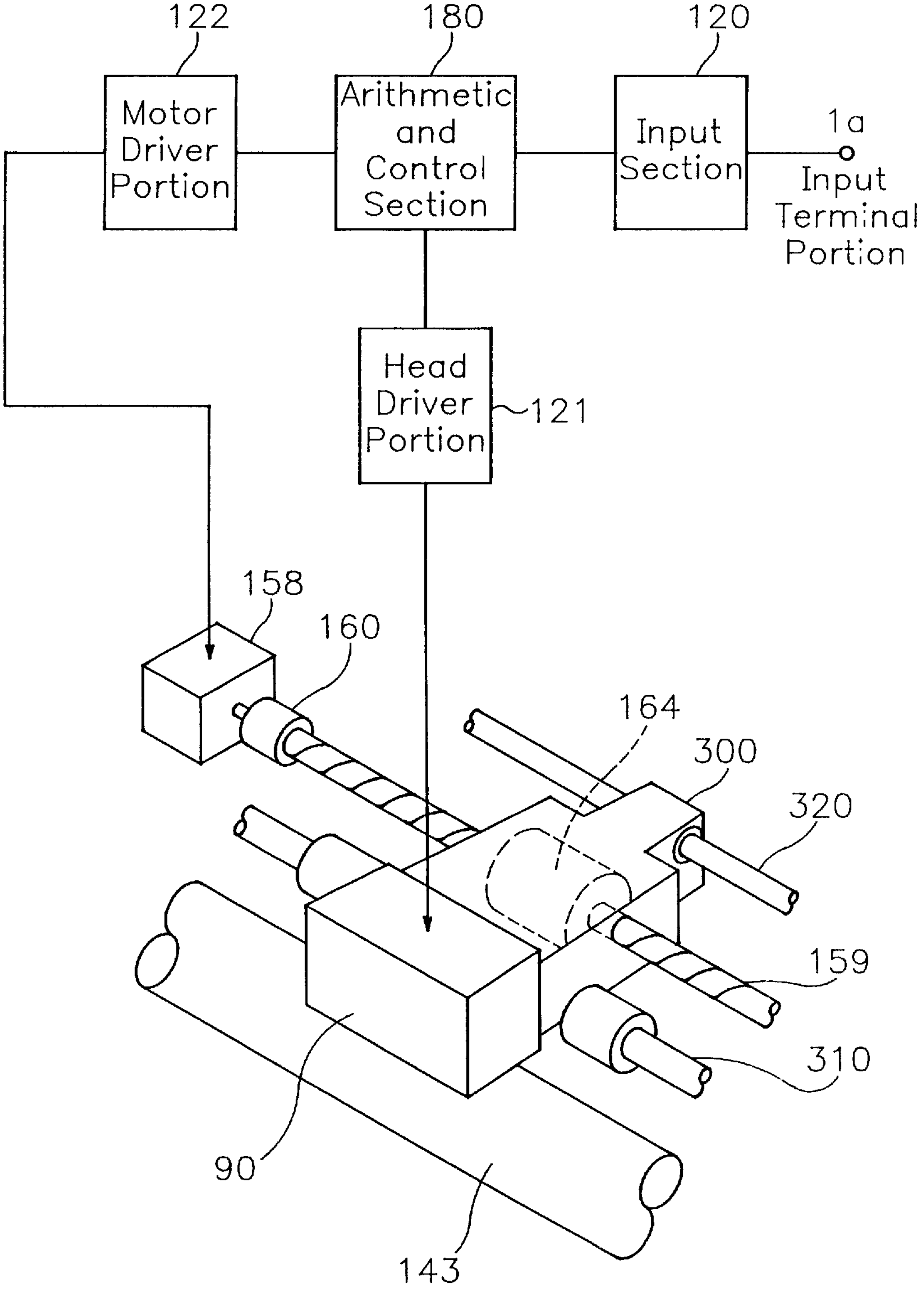
FIG. 19 is a perspective view depicting a carriage and a driving mechanism for use in the invention.

FIG. 19 shows the spatial relationship among carriage 300, screw 159, nut 164 of the embodiment together with the driver circuit comprising motor driver portion 122, arithmetic/control section 180, input section 120, head driver portion 121, and input terminal portion 1*a*. A signal obtained by measurement of an object is applied to input terminal la and then sent to srithmetic/control section 180 via input section 120 comprising selector switch, preamplifier and A/D converter, etc (not shown). Motor driver portion 122 drives stepping motor 158 according to results of calculation performed by arithmetic/control section. Then, a head driver portion 121 causes recording head assembly 90 to print characters or perform impacting operation. As stated, nut 164 is received in a recess (not shown) located under carriage 300. Screw 159 is in mesh with nut 164. Screw 159 may have a shaft portion made of metal. A threaded plastic resin portion may be formed around the shaft. Alternatively, the screw 159 may be made entirely of molded plastic resin.

Figure 20:
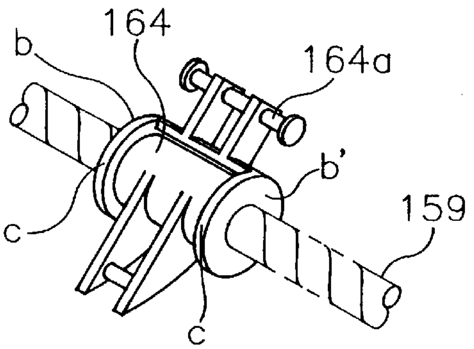
FIGS. 20(*a*) is a perspective view depicting a nut of FIG. 19 the shape thereof and the manner in which the nut is mounted to the carriage.
Figure 20:
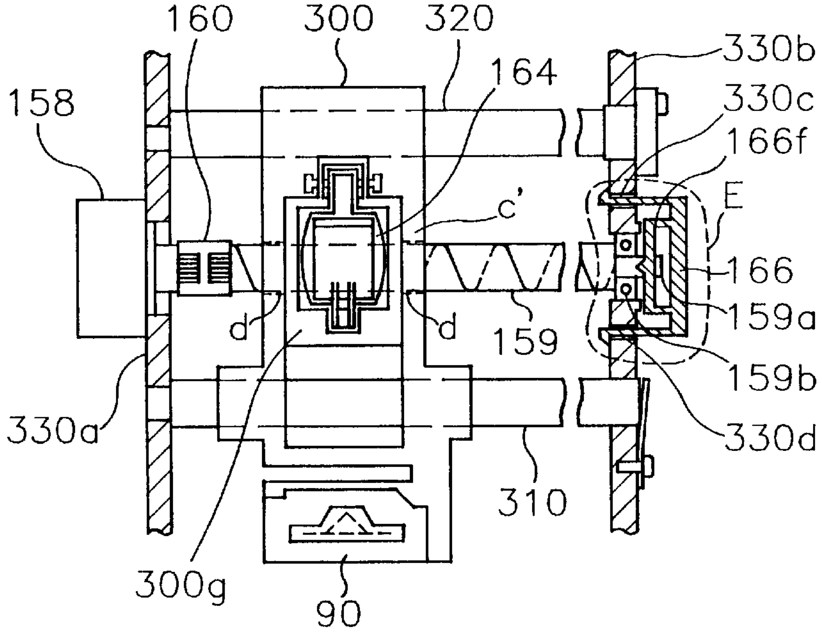
Figure 20:
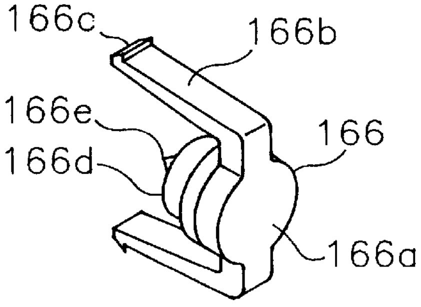
Figure 20:
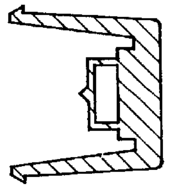

FIG. 20(*a*) shows the shapes of screw 159 and nut 164. FIG. 20(*b*) shows the manner in which carriage 300 is mounted. Carriage 300 is provided with a recess 300*g* (see FIG. 20(*b*)). Nut 164 has a surface "c" (see FIG. 20(*a*)) which is substantially flush with surface "c" of carriage 300 (see FIG. 20(*b*)). Screw 159 is mounted by inserting nut 164 into recess 300*g* in carriage 300 and then meshing nut 164 with screw 159 which extends through a hole "d" formed in the side surface of carriage 300*g* into the side surface of nut 164 (see FIG. 20(*b*)). The side surfaces "b" and "b'" of nut 164 are spherical in shape. When the side surface of nut 164 comes into contact with the inner side surface of the recess 300*g*, dragging and adsorption are prevented. Nut 164 has a pivot 164*a* (see FIG. 20(*a*)) which is rotatably held in a lateral hole extending from recess 300*g*. Nut 164 is designed to rotate about pivot 164*a*.

Figure 21:
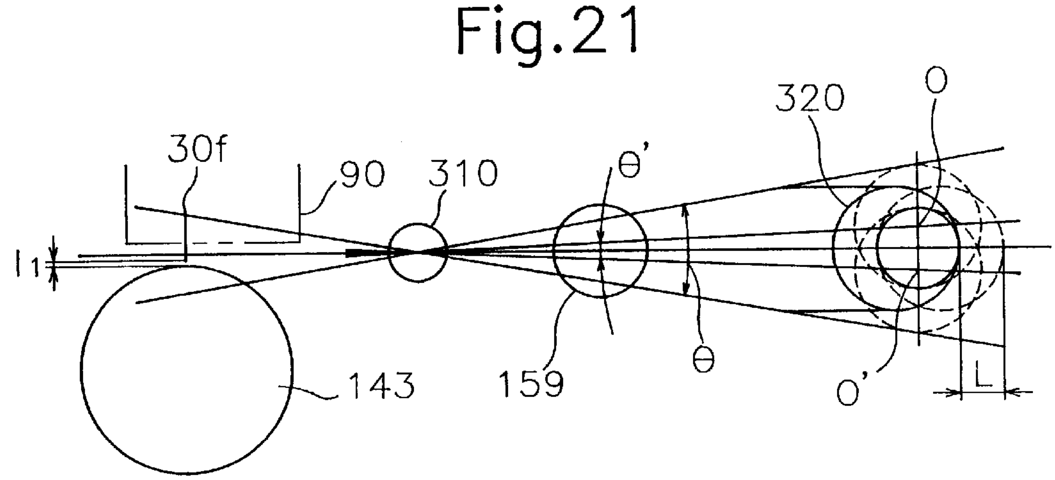
FIG. 21 is a diagram depicting the spacing between the platen of FIG. 19 and an impacting pin, and also depicting movement of a screw or nut caused when the rear portion support shaft of FIG. 19 is rotated to adjust the spacing.

FIG. 21 illustrates the spacing 11 between platen 143 and impacting pin 30*f*, and the movement of screw 159 when rear portion support shaft 320 is rotated to adjust the spacing. Screw 159 is rotated through a maximum angle of θ' according to variations in the axes "0'" and "0'" of axial rod 320*a* of rear portion support shaft 320. Nut 164 and recess 300*g* for receiving nut 164, are formed in such a manner as to absorb the rotation.

Referring again to FIG. 20(*b*), the portion surrounded by dotted line E indicates a support structure for holding the edges of screw 159. The screw 159 has a narrow portion 159*a* in which a bearing 159*b* is inserted. A shaft holder 166 may be molded of a plastic resin and is pressed against the side surface of bearing 159*b*. FIG. 20(*c*) shows shaft holder 166 comprising a disk 166*a* having two resilient legs 166*b* extending outwardly from the fringes of the body of the disk 166*a*. Each leg has an engaging claw 166*c*. A ring spring 166*d*, held by two pillars 166*f* (see FIG. 20(*b*)),is formed under disk 166*a*. Two convex portions 166*e* are formed on ring spring 166*d* and are spaced about 90 degree from pillars 166*f*. FIG. 20(*d*) shows a cross section of shaft holder 166, which may comprise a plastic resin.

Turning again to FIG. 20(*b*), a side plate 330*b* is provided with two engaging holes 330*c* and 330*d* through which are disposed legs 166*b* with engaging claws 166*c* substantially at right angles to disk 166*a*. When legs 166*b* are inserted into holes 330*c*,330*d*, the convex portions 166*e* push against the side surfaces of bearing 159*b*. As a result, ring spring 166*d* is engaged while slightly warped.

Figure 22:
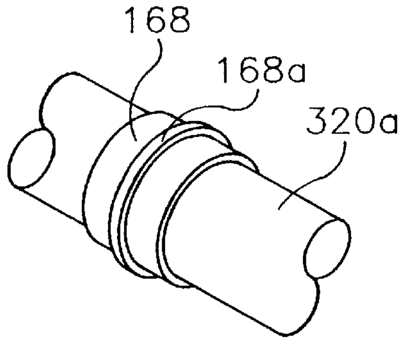
FIGS. 22(*a*), 22(*b*) and 22(*c*) are perspective views depicting a structure holding the rear portion support shaft of FIG. 21, with the rear portion support shaft being formed in the rear of the carriage.
Figure 22:
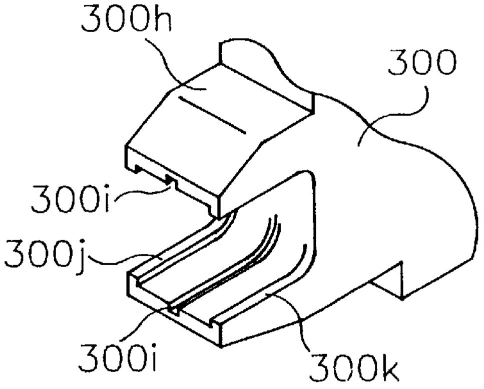
Figure 22:
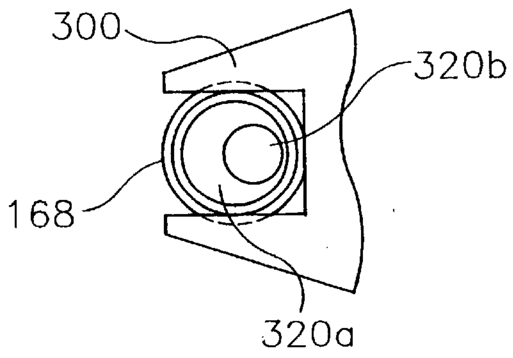

FIGS. 22(*a*),22(*b*) and 22(*c*) show a support structure for rear position support shaft 320 formed in the rear of carriage 300. As shown in FIG. 22(*a*), support structure 300*h* is of U-shaped cross section. Guide grooves 300*i* are formed in the centers of the inner surfaces of the top and bottom portions of the U-shaped support structure. Thick walled fringes 300*j* and 300*k* are formed on the opposite sides of the guide grooves.

FIG. 22(*b*) shows movement limiting bush 168 inserted in support structure 300*h*. Axial rod 320*a*, forming the rear portion support shaft, slidably extends through an inner portion of a cylindrical body made of a plastic resin. The cylindrical body has an outer portion. A convex engaging ring 168*a*, inserted in guide groove 300*i* without any play, is formed in the center of the outer portion of the cylindrical body.

FIG. 22(*c*) shows movement limiting bush 168 inserted in support structure 300*h* and through which the rear portion support shaft 320 extends. The outer surface of bush 168 is in contact with the thick walled portion 300*j* and 300*k* of the support structure. Engaging ring 168*a* is inserted in the upper and lower grooves 300*i* in support structure 300*h*.

In the foregoing configuration, carriage 300 slides across paper along rear portion support shaft 320. The bush 168 absorbs longitudinal movement of the carriage caused when a narrow portion 320*b* of the rear portion support shaft is rotated to adjust the spacing between the impacting pin and the platen.

Figure 23:
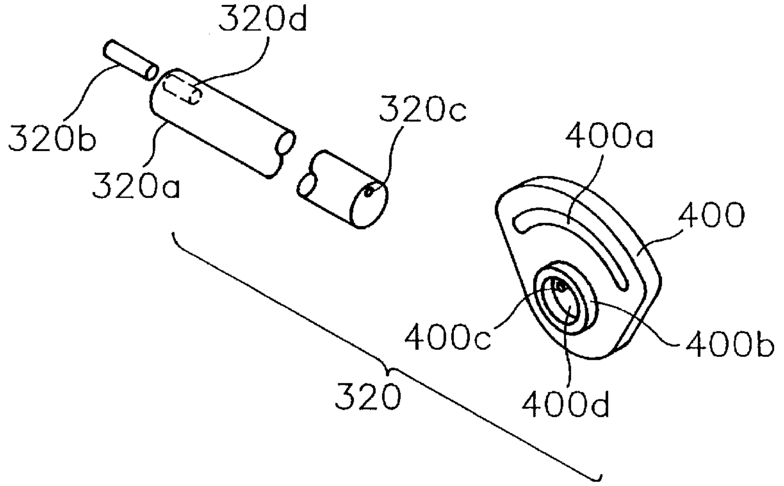
FIGS. 23(*a*) and 23(*b*) are perspective views depicting a lever plate to which an axial rod is mounted to form a rear portion support shaft.
Figure 23:
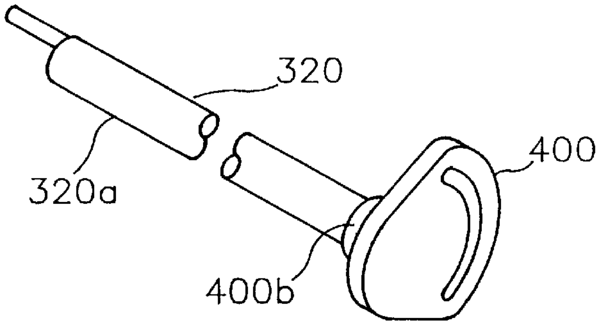

FIG. 23(*a*) shows rear portion support shaft 320 comprising a sectorial lever plate 400 and axial rod 320*a*. An arcuate hole 400*a* is formed near the outer periphery of lever plate 400. A boss 400*b* is formed and located on the opposite side of arcuate hole 400*a*. Boss 400*b* is provided with a fixed hole 400*d* in which axial rod 320*a* is securely inserted without any substantial amount of play. A pin 400*c* is mounted on boss 400*b* and is inserted in an eccentric hole 320*c* formed at one end of axial rod 320*a*. Fixed holed 400*d* is located in an eccentric relation to boss 400*b*. Pin 400*c* is located in the center of boss 400*b*. Another eccentric hole 320*d* is formed at the other end of axial rod 320*a*. The two eccentric holes 320*c* and 320*d* are located symmetrically. Narrow portion 320*b* of the rear portion support shaft is mounted by press fitting in eccentric hole 320*d*.

Figure 1:
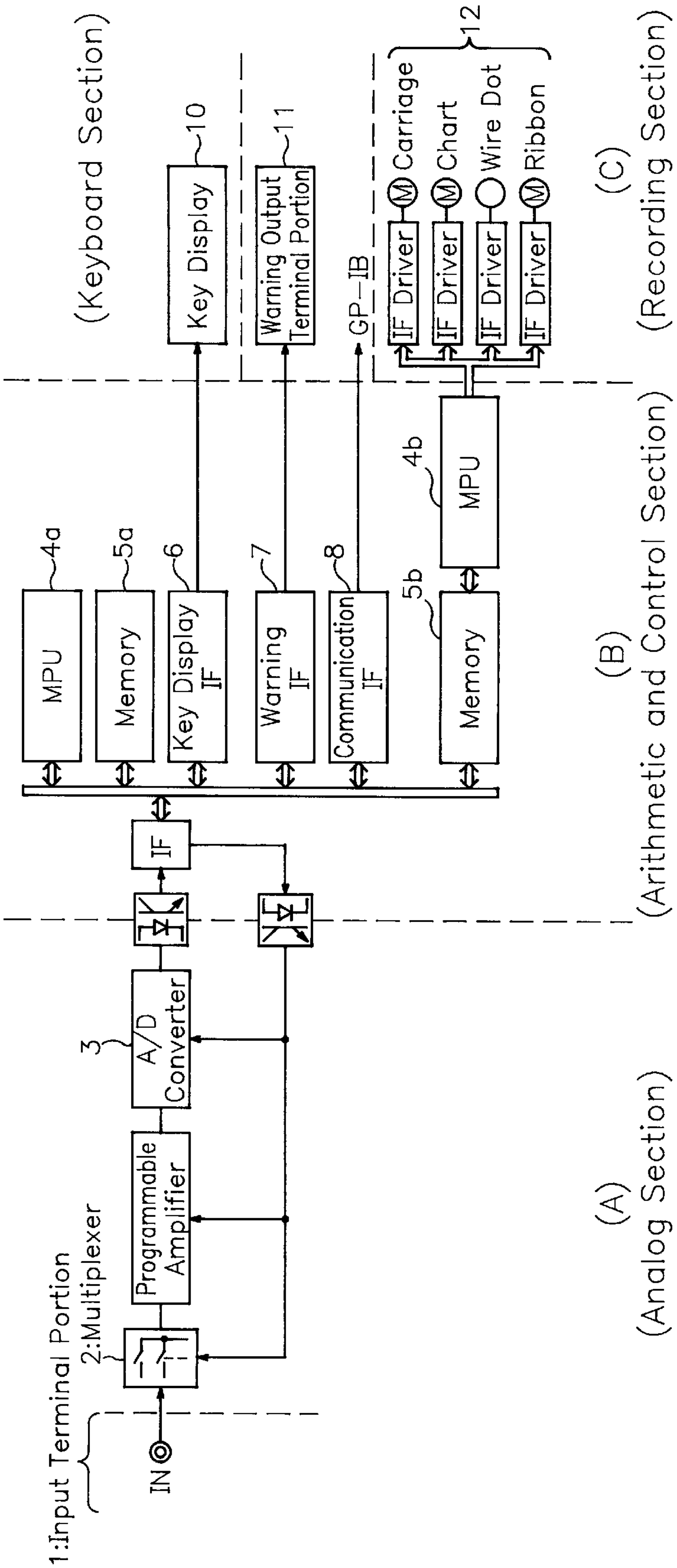
Fig. 1 PRIOR ART
FIG. 1 is a block diagram depicting a conventional hybrid recorder.
Figure 2:
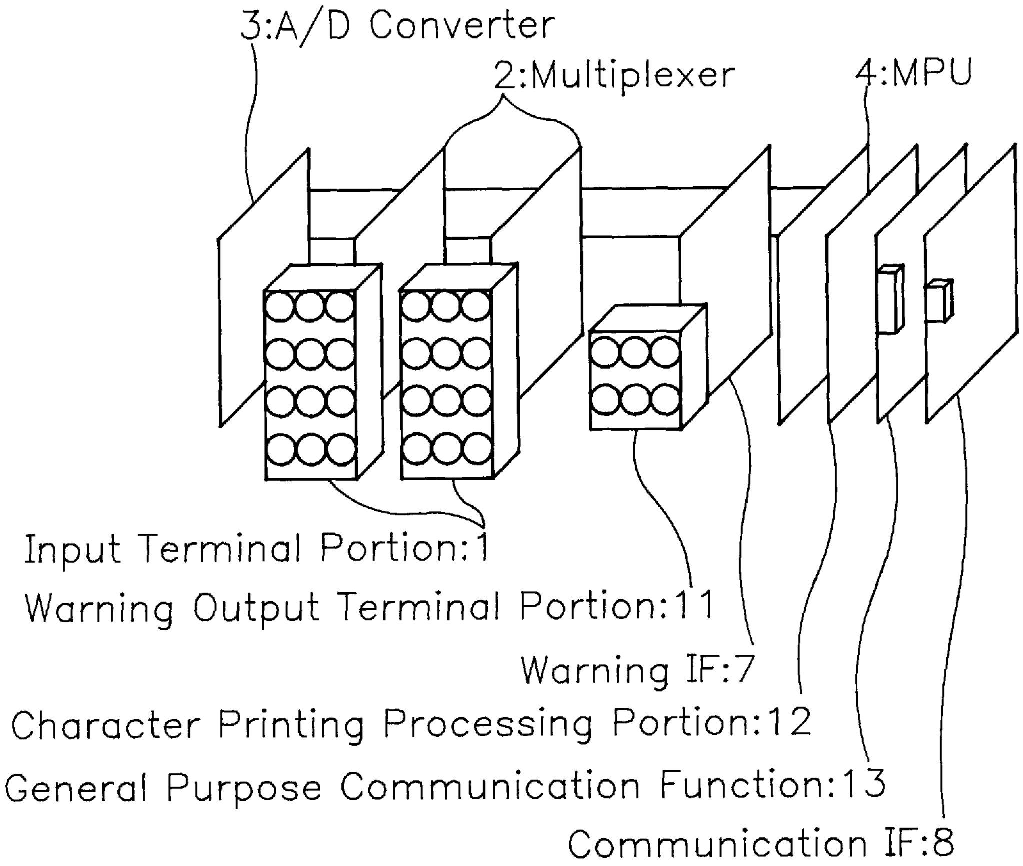
Fig.2 PRIOR ART
FIG. 2 is a block diagram depicting the functions of the recorder of FIG. 1.
Figure 3:
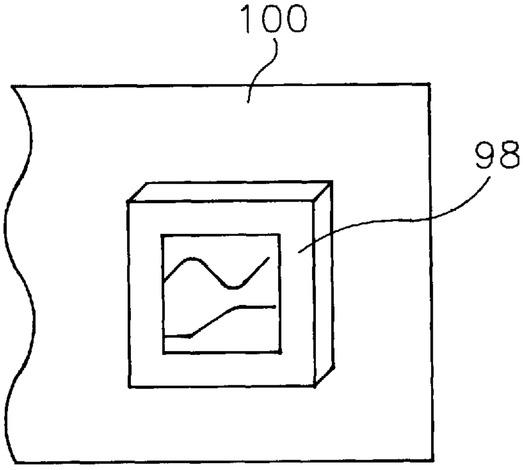
Fig.3 (a) PRIOR ART
FIG. 3(*a*) is a front elevational view depicting a recorder.
Figure 3:
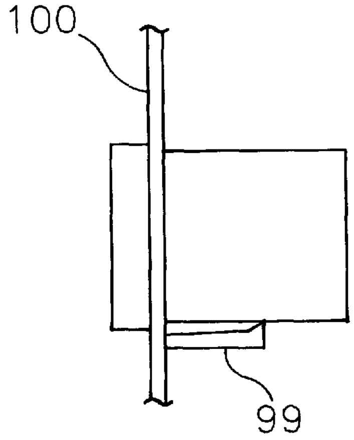
Fig.3 (b) PRIOR ART
Figure 4:
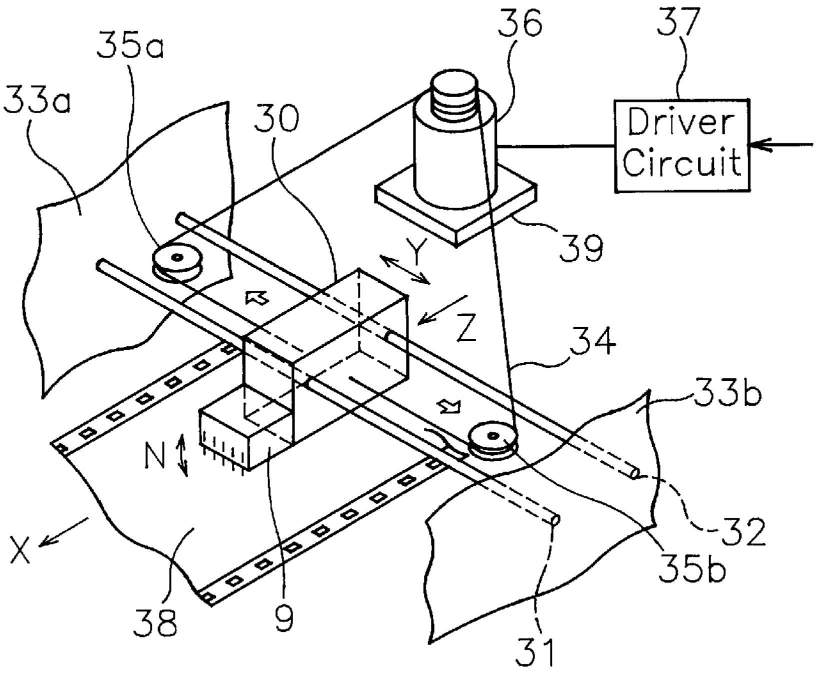
Fig.4 PRIOR ART
FIG. 4 is a perspective view depicting a printing mechanism of a conventional data processor.
Figure 5:
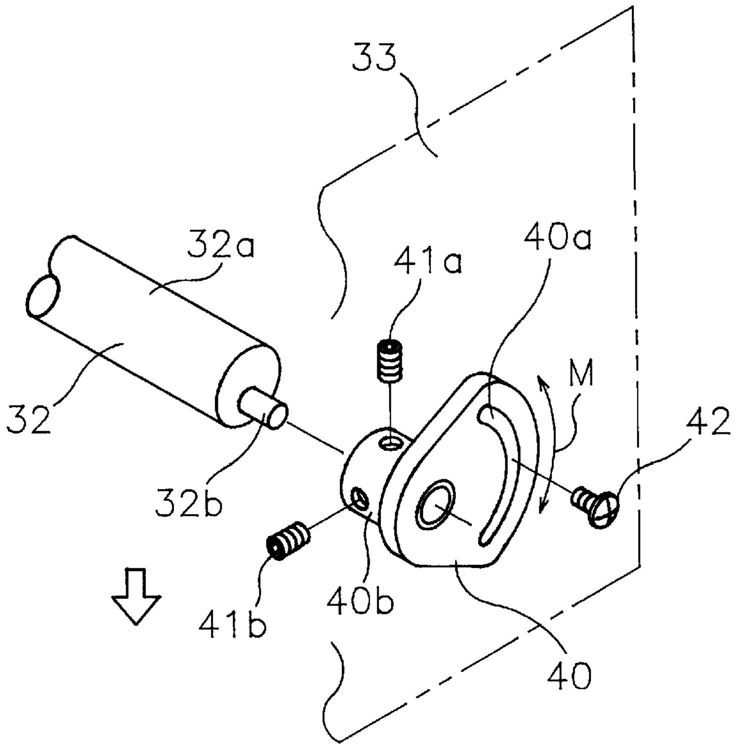
Fig.5 PRIOR ART
FIG. 5 is an exploded perspective view depicting a conventional rear portion support shaft having an eccentric part.
Figure 6:
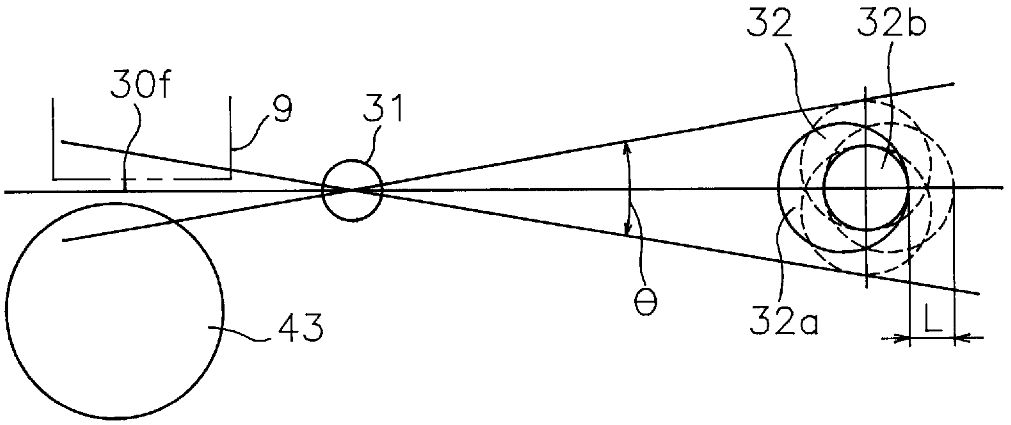
Fig.6 PRIOR ART
FIG. 6 is a diagram depicting displacement of the spacing between the conventional impacting pin and the outer periphery of a platen when the rear portion support shaft of FIG. 5 is rotated.
Figure 7:
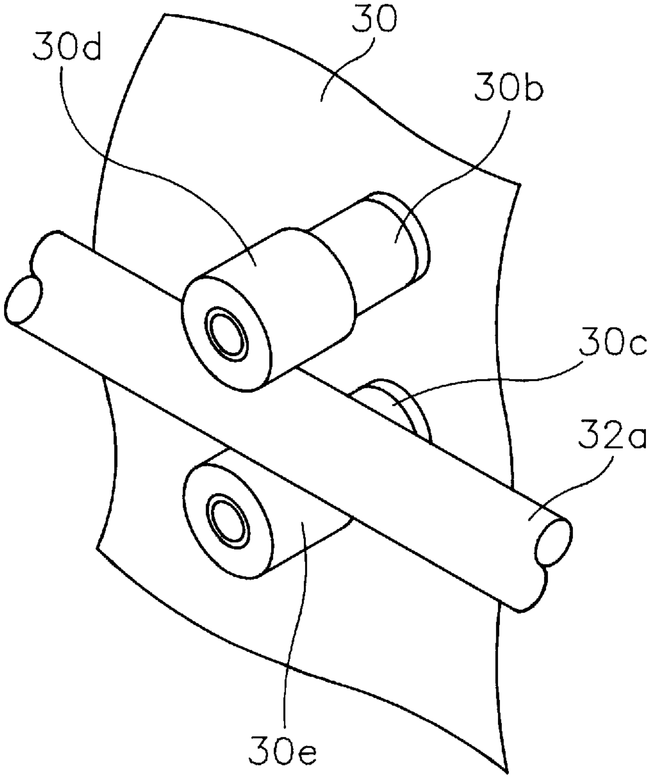
Fig.7 PRIOR ART
FIG. 7 is a perspective view depicting a conventional structure holding the rear portion support shaft of FIG. 5.

FIG. 23(*b*) shows axial rod 320*a* mounted in lever plate 400 to form rear portion support shaft 320. When boss 400*b* of lever plate 400 and narrow portion 320*b* of rear portion support shaft 320 are inserted into side plate 330 (see FIG. 20(*b*)) and rotated, then the plate acts as an eccentric shaft. At a position where the spacing between the front end of impacting pin 30*f* (see FIG. 21) and the outer surface of platen 143 is made optimal, a screw (not shown) is screwed into the arcuate hole 400*a* in lever plate 400 and fixedly mounted to side plate 330 in the same manner as discussed with reference to FIG. 5.

Figure 8:
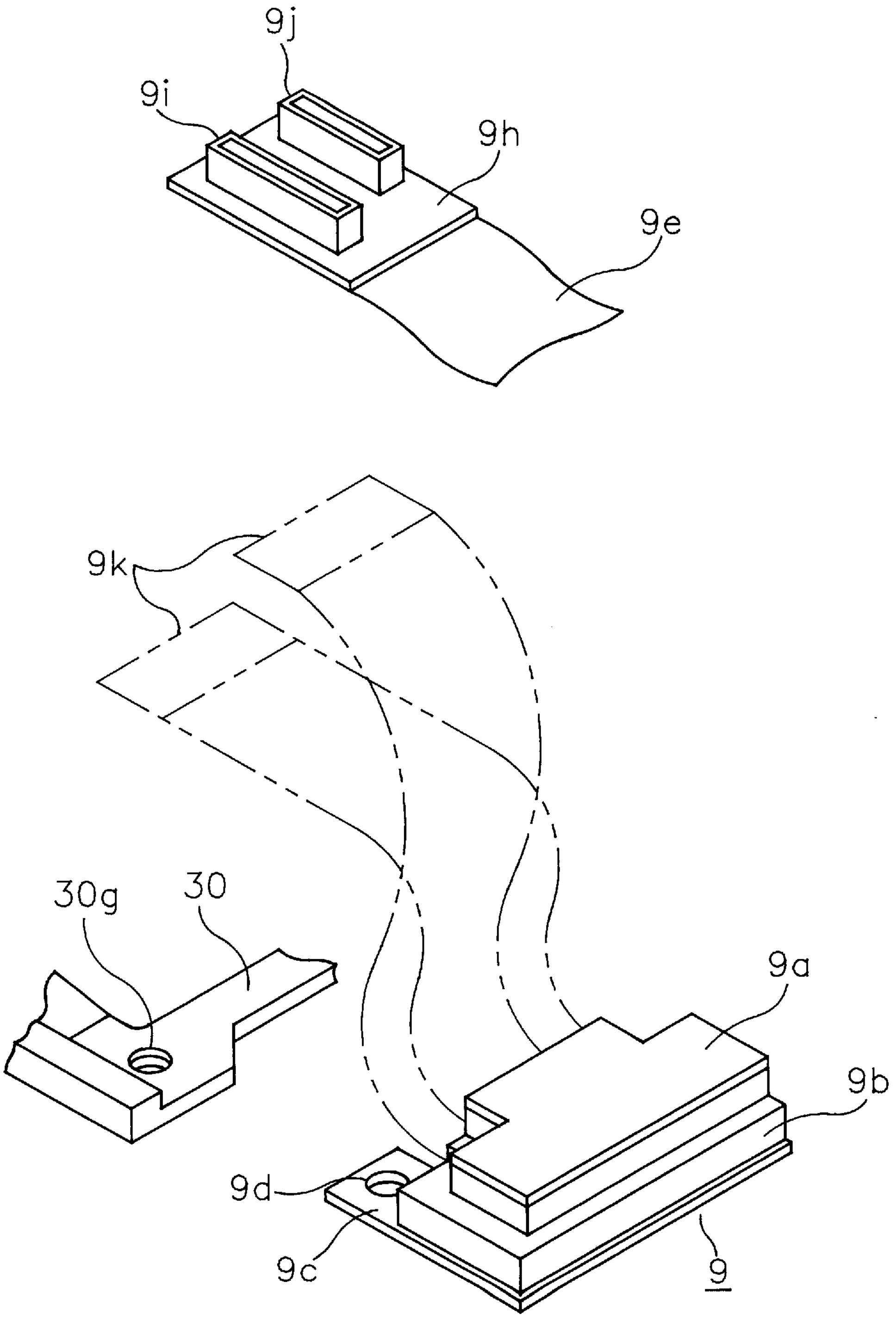
Fig.8 PRIOR ART
FIG. 8 is an exploded perspective view depicting a conventional structure for mounting a recording head assembly.
Figure 9:
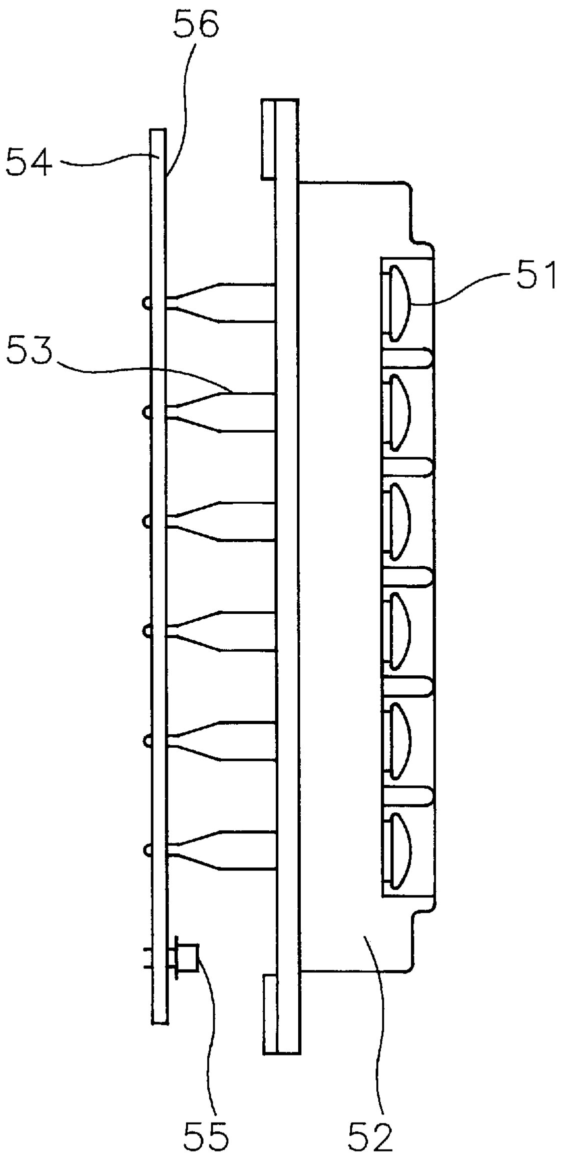
Fig.9 PRIOR ART
FIG. 9 is a side elevational view depicting an input terminal portion of a conventional data processor.
Figure 24:
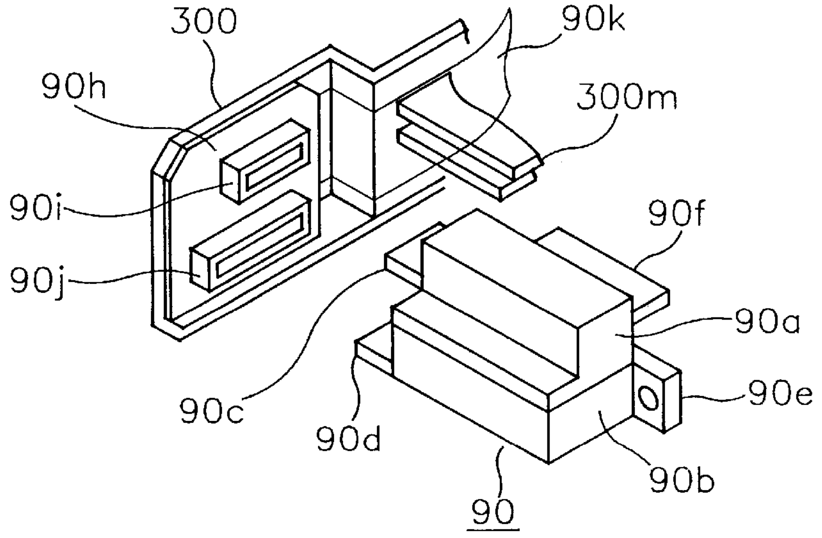
FIG. 24 is a perspective view depicting main portions of a carriage to which a recording head assembly is mounted.

FIG. 24 shows recording head assembly 90 and carriage 300 and the manner in which head assembly 90 is mounted on carriage 300. In the same manner as discussed with reference to FIG. 8, a top head 90*a* for printing characters and a bottom head 90*b* for making a recording according to the magnitude of a signal obtained by measurement are formed in two layers, and an impacting pin is located under the head assembly. Top head 90*a* and bottom head 90*b* are mounted on a top printed wire board 90*c* and a bottom printed wire board 90*d*, respectively. The printed wire boards 90*c*, 90*d* have end portions protruding from the heads. A fixed plate 90*e* and a sliding palte 90*f* are fixed to the recording head assembly.

Carriage 300 has a guide member. 900*m* for guiding the recording head assembly 90. A relay plate 90*h* is made of a flexible circuit and is equipped with connectors 90*i* and 90*j* opposite to top printed wire board 90*c* and bottom printed wire board 90*d*, respectively.

When recording head assembly 90 is mounted on carriage 300, sliding plate 90*f* is made to slide on guide member 900*m* so as to align the head 90 to carriage 300. The edges of the top and bottom printed wire boards 90*c*, 90*d*, respectively, are inserted into insertion ports 90*i*, 90*j* in the connectors. As a result, reliable and accurate electrical connections are made.

The inside casing 155, rear cover 157, joint 160, chart chassette 156 (shown in FIG. 18), screw 159, nut 164, shaft holder 166, carriage 300 (shown in FIG. 20), movement limiting bush (shown in FIG. 22) , and lever plate 400 (shown in FIG. 23) are integrally molded of plastic resin.

As described, the screw is used to drive the carriage. Hence, recordings can be carried out without any errors. One end of the screw is secured to one side plate via a bearing. A spring member mold of plastic resin pushes against the side surface of the bearing. Thus, the number of components is reduced. Also, the number of steps required to assemble the system is reduced.

Also, both side surfaces of nut 164 are made to be spherical in shape. Thus, adsorption and dragging on the contact surface with the recessed side surface of carriage 300 are prevented from occurring. This enables the movement to be smooth.

Moreover, the rear portion support shaft 320 is held by movement limiting bush 168 disposed in the rear of the carriage. In the rear portion support shaft, a narrow shaft and a rotating member are inserted in holes in the end surfaces, respectively, of the axial rod, the holes being located off the centers of the respective end surfaces. Recording head assembly 90 is caused to engage guide member 300*m* mounted on carriage 300. Then, head assembly 90 engages connectors 90*i*, 90*j* on the carriage for the printed wire boards. The inside casing 155 (see FIG. 18) forming the inside plate is molded of a plastic resin. Thus, the entire apparatus can be assembled of a reduced number of components and the number of steps required to assemble the apparatus can be reduced.

Figure 25:
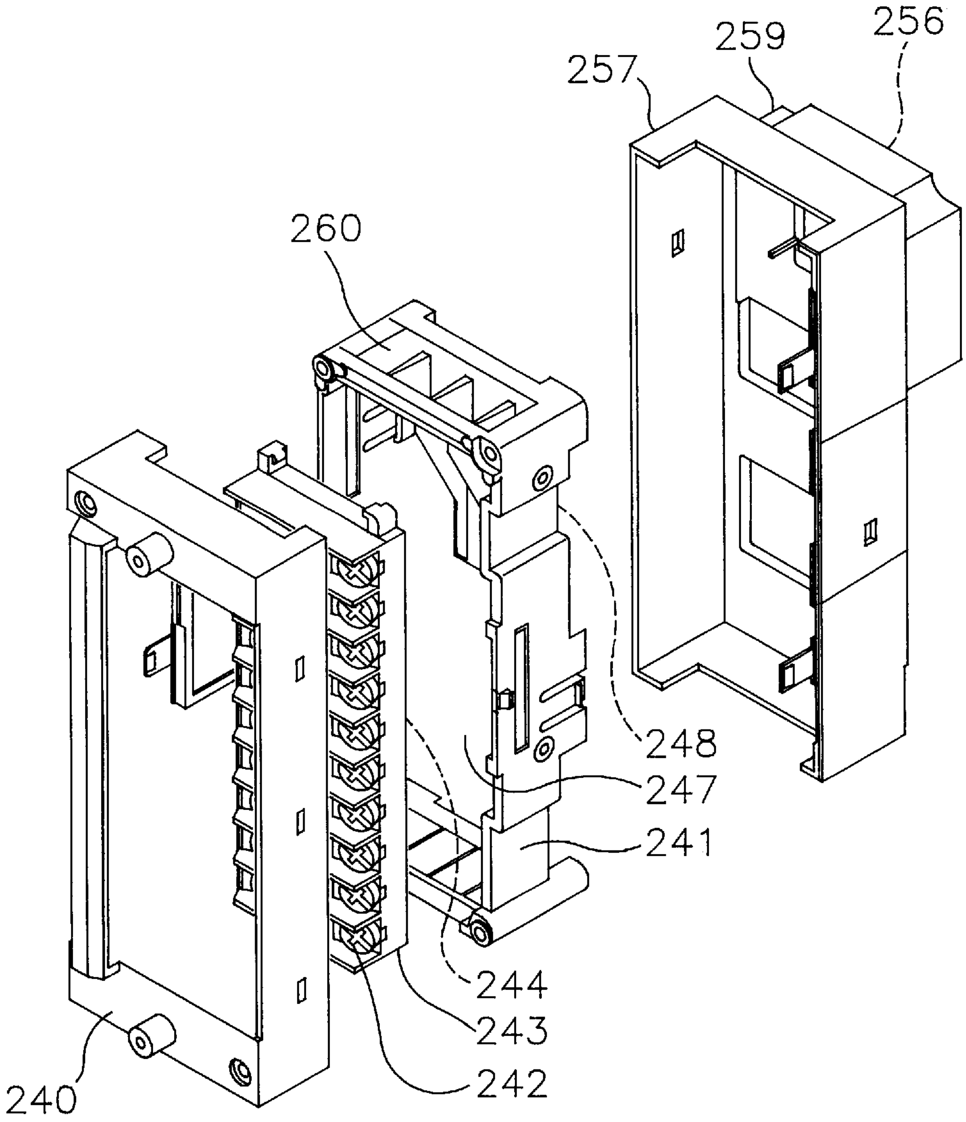
FIG. 25 is an exploded perspective view depicting main portions of an input unit for use with the invention.
Figure 26:
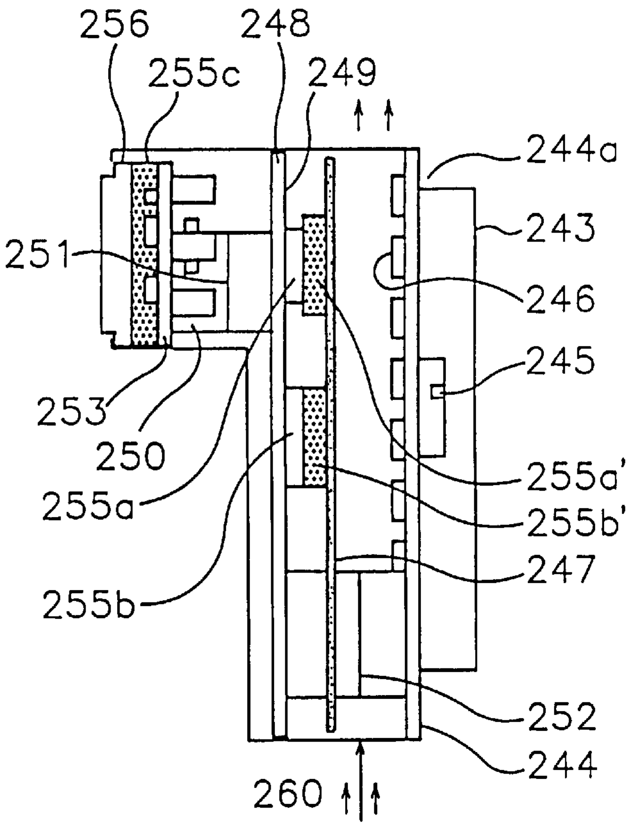
FIG. 26 is a cross sectional view depicting main parts of the embodiment of FIG. 25.
Figure 27:
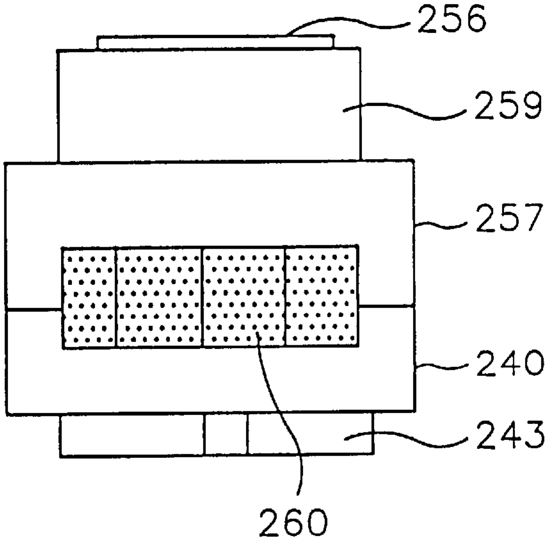
FIG. 27 is a plan view depicting main portions of the embodiment of FIG. 26.

FIGS. 25, 26, and 27 show an input unit according to the invention, wherein FIG. 25 is a perspective view, FIG. 26 is a cross sectional view, and FIG. 27 is a plan view. The input unit comprises a front cover 240 and a connecting member 241. Input terminals 242 are mounted on a terminal base 243 which is disposed between front cover 240 and connecting member 241. As shown in FIG. 26, a measuring terminal section 244*a*, including a first printed wire board 244, is mounted on the rear surface of terminal board 243. A temperature sensor 245, used for compensation of a reference junction, and an input selector means or scanner 246, used for sequentially selecting and transmitting inputs, are disposed on first printed wire board 244. A heat dissipating air circulation passage 260 is formed between first printed wire board 244 and connecting member 241 to dissipate heat from a first heat dissipating board 247 held by connecting member 241. First printed wire board 244 comprises a core of a metal, such as aluminum or copper, and insulating members at both surfaces.

A second printed wire board 248 has an A/D conversion means on one side thereof. A DC/DC conversion means 250 is formed on a third printed wire board 253 (see FIG. 26) and takes the form of a laminate close to the end of the other surface of second printed wire board 248. DC/DC conversion means 248 is connected to A/D coversion means 249 via a connector 251. Second printed wire board 248 is connected to first printed wire board 244 via a connector 252 while the surface having the A/D conversion means 249 faces first heat dissipating board 247.

Thermally conducting heat dissipating members 255*a*, 255*b* are mounted between second printed wire board 248 and first heat dissipating board 247. In this embodiment, the heat dissipating members are molded of a mixture of silicon gel and a special ceramic. The heat dissipating members act to transmit heat dissipated from the generating parts of A/D conversion means 249 to first heat dissipating board 247.

A second dissipating board 256 (see FIG. 26) dissipates heat from heat generating components forming the DC/DC conversion means via a thermally conducting heat dissipating member 255*c* which is in contact with the heat generating components. A rear cover 257 (see FIG . 25) holds second heat dissipating board 256 on which DC/DC conversion means 250 is laminated. A convex receiving portion 259 is formed a the location of the laminate. The rear cover 257 engages connecting member 241 and covers it together with the front cover 240 when it is fixedly mounted.

An air conditioning passage 260 is formed between first printed wire board 244 and first heat dissipating board 247. Heat from heat generating components, forming the A/D conversion means on the second printed wire board 247 via thermally conducting heat dissipating members 255*a*, 255*b*. Heat from the heat generating components forming DC/DC conversion means is dissipated to second heat dissipating board 256 via thermally conducting heat dissipating member 255*c*. Second heat dissipating board 256 is in contact with other heat dissipating boards (not shown) of greater area to enhance the heat dissipation.

After the input signal is converted into digital form by A/D converter 249, the digital signal is applied to the body of the recorder, a person computer , or the like.

Advantageously, the front cover 240, terminal base 243, connecting member 241, and rear cover 257 may be integrally molded of plastic resin. The engaging claws and engaging holes (not shown) formed on and in the foregoing components make it possible to assemble the components into a single unit.

Advantageously, when the electronic parts are disposed on the first printed wire board 244 and generate heat, and causes elevation of temperature, the heat is readily dissipated because the printed wire board itself is a good thermal conductor. Air circulation path 260 is formed on one face of the board, thus promoting greater and quicker dissipation of heat. Heat generating electronic parts disposed on the second printed wire board 248 are in contact with the first and second heat dissipating boards via the thermally conductive heat dissipating members. Since the heat is dissipated by the heat dissipating boards, an input heat dissipating structure is provided by the invention which has thermal insulation between the first and second printed wire boards and which thus provides protection against undue heating.

The foregoing description is illustrative of the invention. Numerous extensions and modifications thereof would be apparent to the worker skilled in the art. All such extensions and modifications are to be considered to be within the spirit and scope of the invention.

What is claimed is:

1. A data processor comprising:

at least one input means for receiving signals from an object being examined and for converting said signals into digital form, said at least one input means comprising communication means for outputting the converted digital signals;

data collecting means comprising at least one connector to which said at least one input means is attached, an arithmetic/communication means having information about position at which said at least one connector is mounted, and collecting said signals from said object, and performing arithmetic processing, and further comprising storage means for storing results of said arithmetic processing; and control means for processing signals, using the signals stored in said storage means and for producing recordings based on the processed signals; wherein said control means communicates with said arithmetic/communication means and has a function of recognizing a whole structure according to response from said data collecting means.

2. The processor of claim 1, wherein said control means comprises measuring means and display means, said measuring means comprising a power supply, said display means, display control means, and a reception means; and wherein said measuring means is connected to said display means by a communication cable.

3. The processor of claim 1, further comprising input/output means for communicating with other devices; and warning means selectively connected to said at least one connector.

4. The processor of claim 1, wherein said data collecting means is fixedly mounted on said control means.

5. The processor of claim 1, wherein said data collecting means is disposed apart from said control means, and wherein said control means is connected to said arithmetic/communication means by a communication cable.

6. The processor of claim 1, wherein said data collecting means comprises a plurality of data collecting means and a plurality of connectors having same standards; and wherein one of said plurality of data collecting means is fixed on said control means; and wherein others of said plurality of data collecting means are located apart from said control means; and wherein said arithmetic/communication means is connected to other components by a communication cable.

7. A data processor comprising:

at least one input means for receiving signals from an object being examined and for converting said signals into digital form, said at least one input means comprising communication means for outputting the converted digital signals;

data collecting means comprising at least one connector to which said at least one input means is attached, an arithmetic/communication means having information about position at which said at least one connector is mounted, and collecting said signals from said object, and performing arithmetic processing, and further comprising storage means for storing results of said arithmetic processing; and control means for processing signals, using the signals stored in said storage means and for producing recordings based on the processed signals;

wherein said control means has a character printing means comprising support means for holding a carriage having a recording head assembly thereon in such a manner that the carriage moves across a paper, and driver means for driving said carriage, and wherein said driver means comprises a motor, a screw connected to a driving shaft of said motor, and a nut mounted on said carriage and meshed with said screw.

8. The processor of claim 7, wherein said support means comprises a front portion support shaft and a rear portion support shaft having an eccentric portion.

9. The processor of claim 7, wherein said screw is made of molded plastic resin.

10. The processor of claim 7, wherein said screw comprises one end mounted on a side plate, and wherein a bearing is provided having a side surface, and wherein further a plastic spring is provided against said side surface of said bearing.

11. The processor of claim 10, wherein said side plate comprises an inside casing, said inside casing being molded of plastic resin.

12. The processor of claim 7, wherein said nut is detachably mounted in a recess formed in said carriage when said screw is not in mesh with said nut, and wherein said nut swings about a rear portion support shaft of said support means when said screw is in mesh with said nut.

13. The processor of claim 7, wherein said nut has two side surfaces extending across a paper, and wherein both said surfaces are spherical in shape.

14. The processor of claim 7, further comprising a movement limiting bush capable of moving in a direction in which said paper is fed, said bush being mounted in a rear of said carriage, and wherein movement of said bush across said paper is limited, said bush being provided with a hole extending therethrough, and wherein a rear portion of a support shaft of said support means is slidable through said hole.

15. The process of claim 7, wherein said support means comprises a rear portion support shaft,said rear portion support shaft comprising an axial rod provided with a first hole and a second hole formed in end surfaces, respectively, of said axial rod and disposed off centers of said end surfaces, respectively; and wherein a narrow shaft is inserted in said first hole, a pin is inserted in said second hole, and a rotating means is provided for inserting the entire axial rod into said second hole to lock said axial rod.

16. The processor of claim 7, wherein said carriage has a body having a guide portion, said recording head assembly comprises a sliding portion engaging and sliding on an impact pin, a printed wire board, and said guide portion of said body of said carriage; and wherein said recording head assembly engages a connector of said printed wire board via said guide portion.

17. A data processor comprising:

at least one input means for receiving signals from an object being examined and for converting said signals into digital form, said at least one input means comprising communication means for outputting the converted digital signals; and data collecting means comprising at least one connected to which said at least one input means is attached, an arithmetic/communication means having information about position at which said at least one connector is mounted, and collecting said signals from said object, and performing arithmetic processing, and further comprising storage means for storing results of said arithmetic processing; wherein each of said at least one input means comprises:

a measuring terminal portion comprising a first printed wire board on which are mounted input terminals, a temperature sensor for compensation of a reference point, an input selector means for sequentially selecting and sending input signals;

a second printed wire board provided with electrical conversion means; and connecting means having a first heat dissipating board and an air circulation passage, said first heat dissipating board connected to said first and second printed wire boards.

18. The processor of claim 17, wherein said first printed wire board comprises a thermal conductive core member and an insulating member formed on a surface of said thermal conductive core member, and wherein a conductor pattern is formed on said insulating member.

19. The processor of claim 17, wherein said electrical signal conversion means comprises DC/DC conversion means and A/D conversion means.

20. The processor of claim 19, wherein said DC/DC conversion means comprises heat generating means disposed in contact with a second heat dissipating board.

21. The processor of claim 19, wherein said A/D conversion means comprises a heat generating means disposed in contact with siad first heat dissipating board.

22. The processor of claim 19, wherein said A/D conversion means comprises a heat generating means disposed in contact with said first heat dissipating board.

23. A data processor comprising:

at least one input means for receiving signals from an object being examined and for converting said signals into digital form, said at least one input means comprising communication means for outputting the converted digital signals;

data collecting means comprising at least one connector to which said at least one input means is attached, an arithmetic/communication means having information about position at which said at least one connector is mounted, and collecting said signals from said object, and performing arithmetic processing, and further comprising storage means for storing results of said arithmetic processing; and control means for processing signals, using the signals stored in said storage means and for producing recordings based on the processed signals; wherein each of said at least one input means comprises:

a measuring terminal portion comprising a first printed wire board on which are mounted input terminals, a temperature sensor for compensation of a reference point, an input selector means for sequentially selecting and sending input signals;

a second printed wire board provided with electrical conversion means; and connecting means having a first heat dissipating board and an air circulation passage, said first heat dissipating board connected to said first and second printed wire boards.

24. The processor of claim 23, wherein said first printed wire board comprises a thermal conductive core member and an insulating member formed on a surface of said thermal conductive core member, and wherein a conductor pattern if formed on said insulating member.

25. The processor of claim 23, wherein said electrical signal conversion means comprises DC/DC conversion means and A/D conversion means.

26. The processor of claim 25, wherein said DC/DC conversion means comprises a heat generating means disposed in contact with a second heat dissipating board.

* * * * *